United States Patent [19]
Harada et al.

[11] Patent Number: 5,555,950
[45] Date of Patent: Sep. 17, 1996

[54] BODY STRUCTURE FOR ELECTRIC VEHICLE

[75] Inventors: Junichi Harada; Takuji Tsuchida, both of Susono; Keiji Kunikita, Yokosuka; Katsuhisa Hasegawa, Toyota; Tadahiko Fuse, Yokosuka; Tomoo Suzuki, Zushi, all of Japan

[73] Assignees: Toyota Jidosha Kabushiki Kaisha, Toyota; Kanto Jidosha Kogyo Kabushiki Kaisha, Yokosuka, both of Japan

[21] Appl. No.: 376,660

[22] Filed: Jan. 20, 1995

Related U.S. Application Data

[63] Continuation of Ser. No. 25,246, Mar. 2, 1993, abandoned.

[30] Foreign Application Priority Data

| Mar. 4, 1992 | [JP] | Japan | 4-046596 |
| Mar. 4, 1992 | [JP] | Japan | 4-046704 |
| Oct. 26, 1992 | [JP] | Japan | 4-287784 |

[51] Int. Cl.⁶ ............................. B60K 1/04; B62D 21/15
[52] U.S. Cl. ............... 180/65.1; 180/232; 180/68.5; 280/784; 296/35.2
[58] Field of Search ............... 296/35.2, 188; 180/232, 65.1, 68.5; 280/784, 781

[56] References Cited

U.S. PATENT DOCUMENTS

| 2,959,446 | 11/1960 | Thompson | 296/35.2 X |
| 3,950,011 | 4/1976 | Yamanaka | 296/35.2 X |
| 3,981,530 | 9/1976 | Yamanaka et al. | 296/35.2 |
| 4,174,014 | 11/1979 | Bjorksten | 180/68.5 |
| 4,365,681 | 12/1982 | Singh | 180/68.5 |
| 4,449,603 | 5/1984 | Langwieder et al. | 180/232 |
| 4,754,827 | 7/1988 | Hirabayashi | 180/68.5 |

FOREIGN PATENT DOCUMENTS

| 2522844 | 12/1976 | Germany. |
| 3141164 | 4/1983 | Germany. |
| 60-146724 | 8/1985 | Japan. |

OTHER PUBLICATIONS

SAE Paper 900579, Crashworthiness Of The Electric G–Van, S. Palvoelgyi & P. K. Stangl Universe Engineering pp. 99–105.

*Primary Examiner*—Eric D. Culbreth
*Assistant Examiner*—Michael Mar
*Attorney, Agent, or Firm*—Cushman, Darby & Cushman

[57] ABSTRACT

A body structure for an electric vehicle, which has a battery carrier for containing a battery disposed on a vehicle body thereof, the body structure comprising: a supporting mechanism, which supports the battery carrier; a movement-restricting member, which restricts movement of the battery carrier; and, an energy transfer-control member, which controls transfer of kinetic energy from the battery carrier to the vehicle body upon movement of the battery carrier due to a collision of the vehicle, the collision releasing restriction of movement of the battery carrier applied by the movement-restricting member. While the battery disposed in the vehicle involves a corresponding increase in kinetic energy which acts on the vehicle body, the present body structure minimizes the transfer of such increased kinetic energy to the vehicle body upon collision of the vehicle.

3 Claims, 30 Drawing Sheets

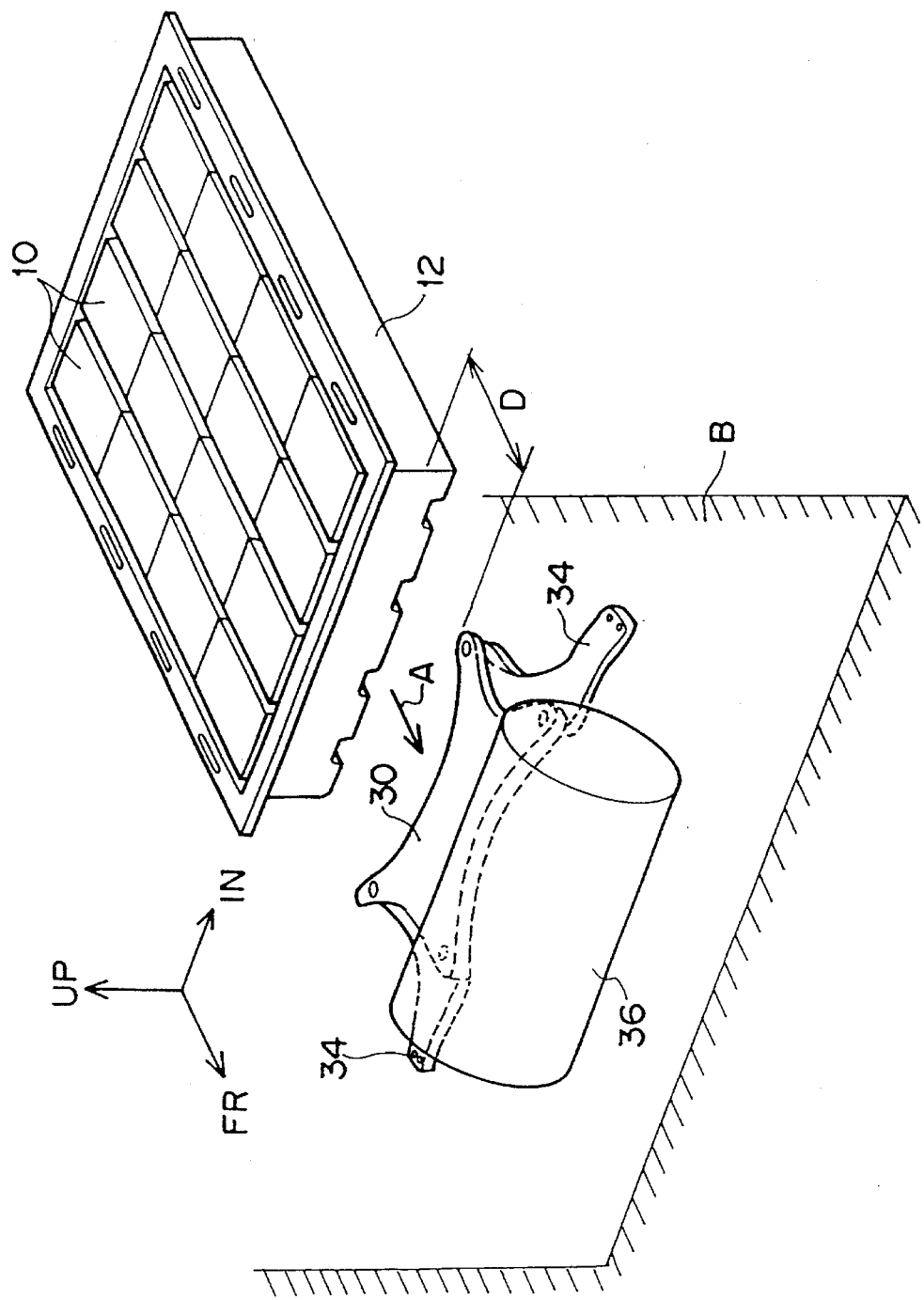

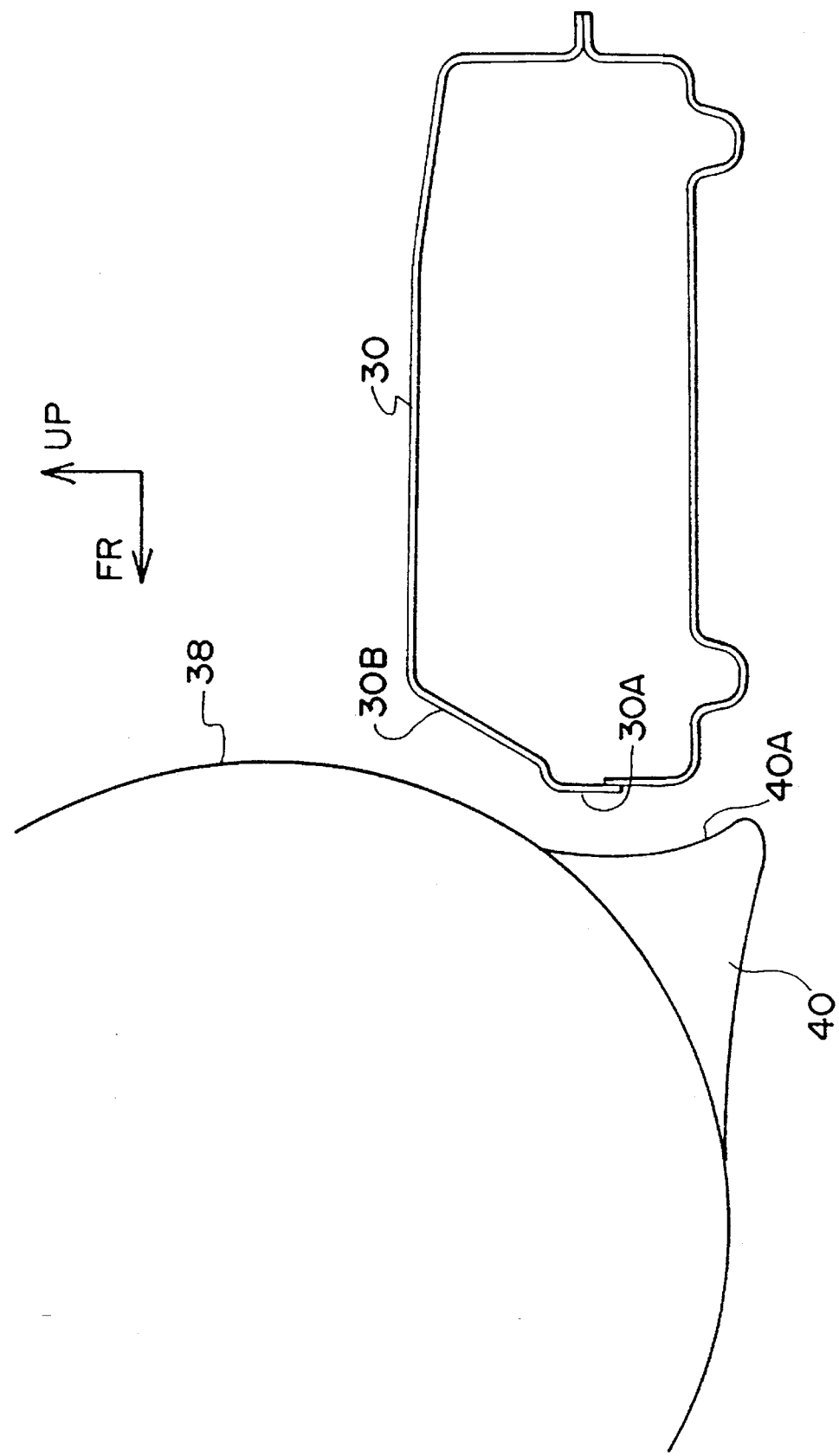

BODY STRUCTURE FOR ELECTRIC VEHICLE

This is a continuation of application No. 08/025,246, filed on Mar. 2, 1993, which was abandoned upon filing hereof.

BACKGROUND OF THE INVENTION

1. Field of the Invention

The present invention relates to an electric vehicle which has a battery carrier for containing a battery disposed on a vehicle body thereof. More particularly, it relates a body structure and a battery-supporting structure for the electric vehicle.

2. Description of the Related Art

Research and development has been carried out on electric cars as a way of providing a pollutant emission-free vehicle. Most of such electric cars use a battery in combination with either an alternating-current motor or a direct-current motor as a power source. The battery is usually accommodated in a battery carrier which is anchored to the underside of a vehicle body by means of bolts and the like. (Refer to Japanese Patent Application Laid-Open No. 60-146724.)

In order to reduce impact force due to a collision, a conventional automobile is designed to permit front-side members and the like to be deformed, thereby absorbing kinetic energy which would otherwise be transferred to the vehicle body thereof.

However, an electric vehicle having a battery has greater body weight than ordinary vehicles. Thus, absorption of kinetic energy requires a corresponding increase in the strength of the front-side members and the like, which further increases body weight.

To solve this problem, an electric vehicle which allows a battery carrier housing a battery to be separated from a vehicle body has been proposed for a vehicle in a collision. (Refer to DT2522844A1). However, this type of electric vehicle only drops the battery carrier to a road surface. It is not disclosed in DT2522844A1 how to manage finally the kinetic energy of the battery carrier.

Another type of electric vehicle has been proposed in which a battery, movably disposed on a crushable rear body of the vehicle, is connected thereto by means of a plurality of connecting means. The kinetic energy of the battery, which is caused by a collision of the vehicle, is thereby absorbed through crush of the rear body. (Refer to DE3141164A1.)

The rear body of this electric car, however, is fabricated to acquire relatively low strength because it is used as a means for absorbing the kinetic energy of the battery. Accordingly, the above strength of the rear body greatly differs from the strength of the rear body, which is required for absorbing impact loading due to a collision at the rear body. This means that this type of car may be an electric vehicle having a very particular rear body structure, which is designed to accommodate only an impact of a front body thereof, because it is very difficult to make the absorption of the kinetic energy of the battery compatible with the absorption of such impact loading. Accordingly, a rear body structure for coping with a bump of the rear body provides no control over the kinetic energy of the battery.

SUMMARY OF THE INVENTION

In view of the above-described related art, an object of the present invention is to provide an electric vehicle which allows for control, upon a collision of the vehicle, over additional kinetic energy acting on a vehicle body thereof, which corresponds to an increase in weight with a battery disposed in the vehicle.

A body structure for an electric vehicle according to a first aspect of the present invention, which has a battery carrier for containing a battery disposed on a vehicle body thereof, the body structure comprising: a supporting mechanism, which supports the battery carrier at the underside of the vehicle body; a movement-restricting means, which restricts movement of the battery carrier in a moving direction of the vehicle; and, an energy transfer-control means, which controls transfer of kinetic energy from the battery carrier to the vehicle body upon movement of the battery carrier due to a collision of the vehicle, the collision releasing restraint on movement of the battery carrier applied by the movement-restricting means.

In the body structure for the electric vehicle according to the present invention, the supporting mechanism supports the battery carrier having the battery therein at the underside of the vehicle body, while the movement-restricting means restricts movement of the battery carrier, which is usually made in a moving direction of the vehicle.

When a predetermined force of inertia is imparted to the battery carrier by a collision of the vehicle, the movement-restricting means releases restriction of movement of the battery carrier, thereby allowing the battery carrier to separate from the vehicle body. The energy transfer-control means then provides control over the transfer of kinetic energy from the separated battery carrier to the vehicle body.

In order to absorb the kinetic energy of the battery carrier, the energy transfer-control means is designed to permit the separated battery carrier from the vehicle body to strike against in-vehicle components that are supported by the vehicle body, after the in-vehicle components stop due to a collision with an impact object. This arrangement blocks the transfer of kinetic energy from the battery carrier to the vehicle body.

Furthermore, the in-vehicle components include: a motor section, which is disposed in front of the battery carrier in the forward direction of the vehicle body; and, a sub-frame, which is provided behind the motor section in the rearward direction thereof. The battery carrier is thereby allowed to move by a shorter distance, and what is more, no additional energy absorption accessories need be provided therein.

The motor section is further provided with a holding mechanism for supporting the sub-frame which may be deformed through the collision. Such a deformed sub-frame is thereby prevented from being driven underneath the motor-section that commonly has a spherical shape. Accordingly, the motor section and the sub-frame can jointly absorb the kinetic energy of the battery carrier.

Furthermore, the sub-frame is formed with a planar surface portion such that the battery carrier is held in contact therewith upon collision of the vehicle. This arrangement ensures that the kinetic energy of the battery carrier is conducted to the sub-frame without being transmitted to any other portions.

In addition, the battery carrier, which is to be struck against the in-vehicle components, is provided with an energy-absorbing mechanism therein. This energy-absorbing mechanism allows less impact force to be transmitted to the in-vehicle components, thereby minimizing damage of the battery carrier.

Furthermore, the kinetic energy of the battery carrier can be absorbed efficiently without loads applied to the vehicle body, when the energy transfer-control means comprises an energy-absorbing mechanism, which is adapted to absorb the kinetic energy of the battery carrier by permitting only a part of the kinetic energy of the battery carrier to be transmitted to the vehicle body after the battery carrier is moved by a limited distance through detachment from the vehicle body without kinetic energy thereof transmitted to the vehicle body, i.e., after the vehicle body is crushed to absorb kinetic energy of the vehicle body itself.

In addition, the above energy-absorbing mechanism comprises an energy-absorbing plate, which is fixed at one end to the vehicle body to absorb the kinetic energy of the battery carrier while being scraped and flexed by the battery carrier which is moving after being separated from the vehicle body. The energy-absorbing plate is further formed with a lower rigid portion, which substantially blocks the transfer of the kinetic energy from the battery carrier to the vehicle body during movement of the battery carrier by a limited distance. The battery carrier is thereby guided along the lower rigid portion of the energy-absorbing plate without any shift in movement of the battery carrier. The kinetic energy of the battery carrier is absorbed by a rigid portion of the energy-absorbing plate after movement of the battery carrier by a further limited distance.

Furthermore, the battery carrier may be supported by the movement-restricting means, to be movable in the forward direction of the vehicle body when a given inertial force is exerted on the vehicle. In addition, the energy transfer-control means may comprise: a flexible energy-absorbing plate, which is fixed at one end to the vehicle body; and, an energy-absorbing guide member, which is provided on the battery carrier to continuously flex the energy-absorbing plate while scraping thereagainst upon movement of the battery carrier in the forward direction of the vehicle body. In this arrangement, the movement-restricting means permits the battery carrier to move in the forward direction of the vehicle body when a given inertial force is imparted to the vehicle through the collision thereof.

Upon such forward movement of the battery carrier as described above, the energy-absorbing guide member, which is disposed on the battery carrier, continuously flexes the energy-absorbing plate, of which one end portion is fixed to the vehicle body, while scraping against the energy-absorbing plate. The kinetic energy of the battery carrier is thereby absorbed and consumed for continuous conversion into the energy of deforming the energy-absorbing plate.

A battery-supporting structure for an electric vehicle according to a second aspect of the present invention, which supports a battery at the underside of a vehicle body thereof, the battery-supporting structure comprising: a support, which is fixed to the underside of the vehicle body, and is formed with a guide groove extending in the longitudinal direction of the vehicle; a bracket, which is provided on a battery carrier for containing the battery, to be held against the guide groove; and, a shear pin, which connects the bracket and the support together.

In addition, an energy-absorbing means may be provided on the vehicle body to absorb the kinetic energy of the battery carrier while restricting movement of the carrier.

Furthermore, a linking member may be provided, of which one end portion is pivotably supported by the vehicle body, the other end portion thereof pivotably supporting the battery carrier.

According to the battery-supporting structure for the electric vehicle, which has the above configuration, the support is anchored to the underside of the vehicle body. The support is formed with the guide groove which extends in the longitudinal direction of the vehicle. The bracket, which is provided on the battery carrier, is held against the guide groove, with the support and the bracket being connected together by means of the shear pin.

When the kinetic energy of the battery exceeds the shearing stress of the shear pin after a collision of the electric vehicle, the shear pin will break away, thereby releasing the support and the bracket connected together. The bracket is then urged into movement along the guide groove in the forward direction of the vehicle body until leaving the support. As a result, the battery carrier drops down to the ground, and no kinetic energy from the battery acts on the vehicle body.

According to a battery-supporting structure having the energy-absorbing means provided therein, an energy-absorbing guide member, for example, is provided on the battery carrier, to continuously flex an energy-absorbing plate, of which one end portion is fixed to the vehicle body, while scraping against the energy-absorbing plate. The kinetic energy of the battery is thereby absorbed and consumed for conversion into the energy of deforming the energy-absorbing plate. By way of a further alternative to the energy-absorbing means, an elastic belt may be used to bind the battery carrier therewith, or an energy-absorbing member may be provided on the battery carrier in a moving direction thereof, in order to absorb the kinetic energy of the battery carrier.

According to a battery-supporting structure having the linking member provided therein, the battery carrier is suspended on the linking member, which is rotatably supported at one end to the vehicle body to swing with the movement of the battery carrier. The battery carrier is thereby prevented from falling to the ground.

The body structure for the electric vehicle according to the first aspect of the present invention, which is arranged as previously described, allows for the control, upon a collision of the vehicle, over additional kinetic energy acting on the vehicle body, which corresponds to an increase in weight with the battery disposed in the vehicle.

The battery-supporting structure for the electric vehicle according to the second aspect of the present invention is adapted to absorb and consume the kinetic energy of the battery through a separation of the battery from the vehicle body or by means of the energy-absorbing means. Accordingly, additional kinetic energy acting on the vehicle body can be absorbed, which corresponds to an increase in weight with the battery disposed in the vehicle.

BRIEF DESCRIPTION OF THE DRAWINGS

FIG. 9 is a perspective view, illustrating a positional relationship between the motor, the sub-frame, and the battery carrier for the vehicle according to the first embodiment immediately before the vehicle collides with the barrier;

FIG. 11 is a cross-sectional side view, showing a positional relationship between the sub-frame and the rib member that is formed on the reduction gear for transferring the driving force from the motor of the electric vehicle in accordance with the first embodiment;

DESCRIPTION OF THE PREFERRED EMBODIMENT

Figure 1:
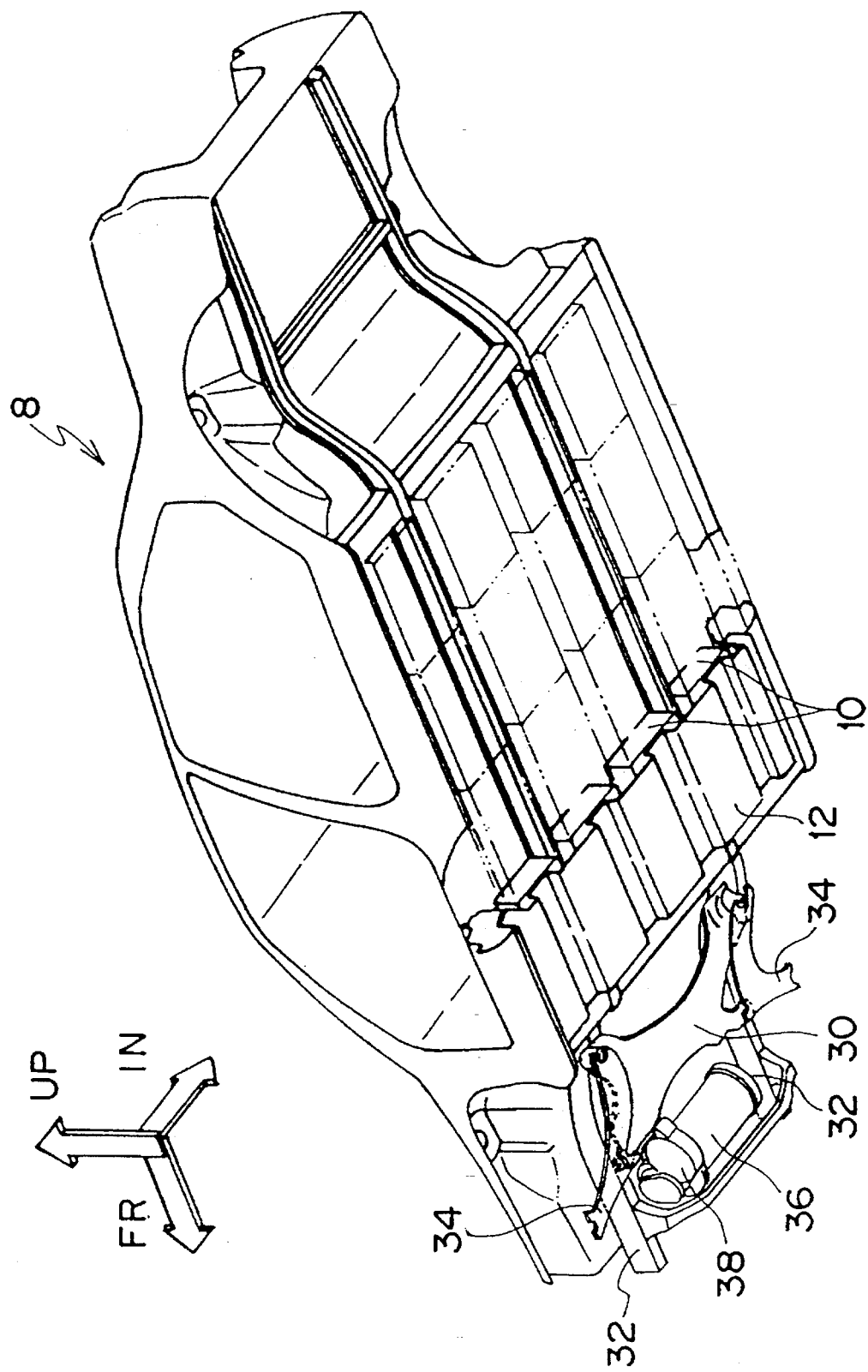
FIG. 1 is a perspective view, illustrating a state in which batteries and in-vehicle components for an electric vehicle in accordance with a first embodiment are mounted to the underside of a vehicle body thereof.

FIG. 1 illustrates a state in which a battery carrier 12 containing batteries 10 is fixed to the underside of a vehicle body 8 of an electric vehicle in accordance with a first embodiment. There is a sub-frame 30 in front of the battery carrier 12 in the forward direction of the vehicle. The sub-frame 30, which is spaced apart from a front surface portion of the battery carrier 12 by a predetermined distance, is anchored to a pair of front-side members 32, spanning therebetween. A pair of suspension arm members 34 are mounted at both end portions of the sub-frame 30 in order to restrict wheel movement. There is a motor section which is disposed in front of the sub-frame 30 in the forward direction of the vehicle. The motor section includes a motor 36 and a reduction gear 38 connected via an unillustrated motor mount to drive the vehicle.

Figure 2:
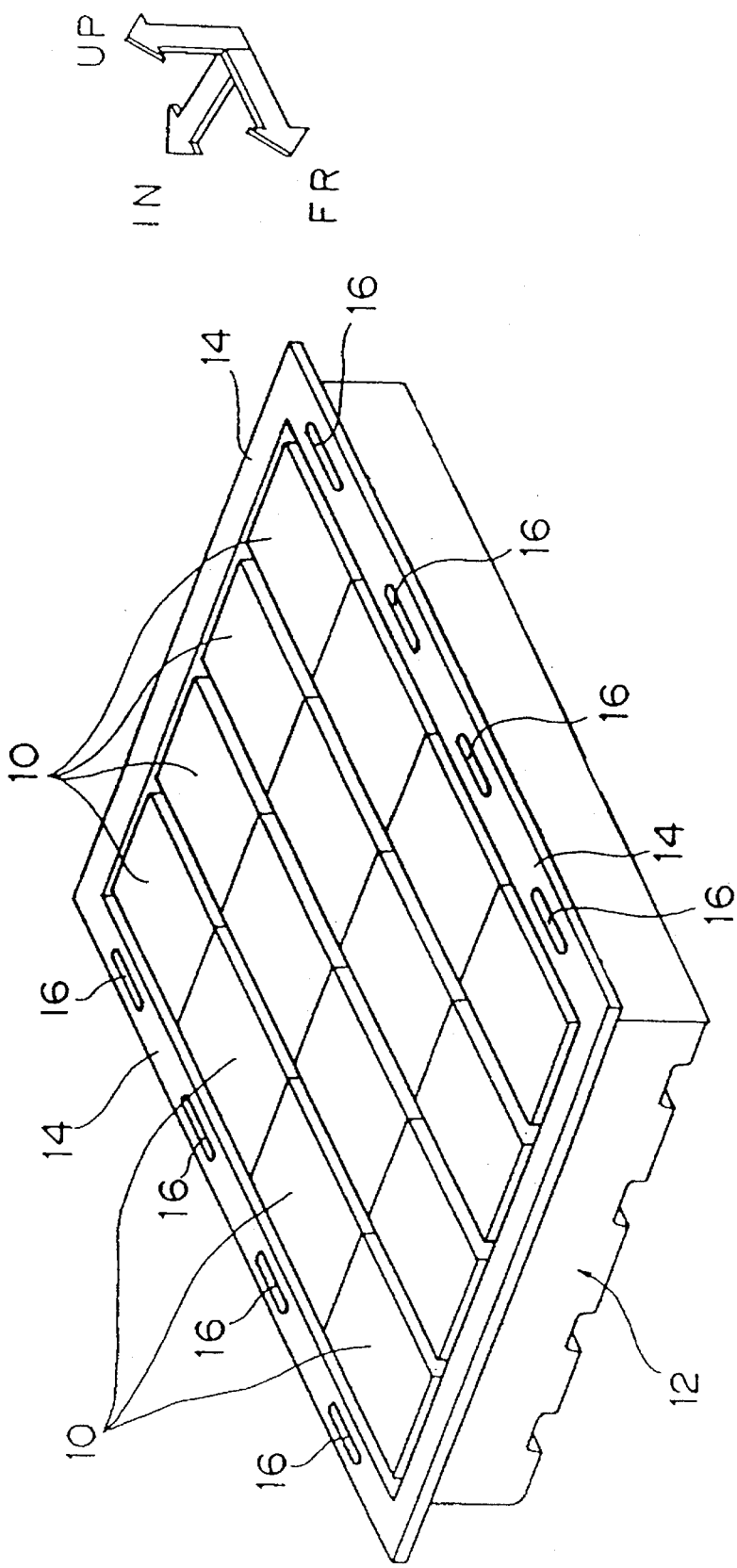
FIG. 2 is a perspective view, illustrating a battery carrier for the electric vehicle according to the first embodiment.

FIG. 2 illustrates the battery carrier 12, which is a rectangular-shaped box, with an upper portion thereof being open. Batteries 10, serving as a power source for the electric vehicle, are accommodated therein. The battery carrier 12 is formed with flange portions 14, which extend in the horizontal direction from the outer-periphery of the open portion of the battery carrier 12. The flange portion 14 is further formed with a plurality of elongated holes 16 in the sides which are in the transverse direction of the vehicle. The holes 16 are punched to extend in the longitudinal direction of the vehicle.

Figure 3:
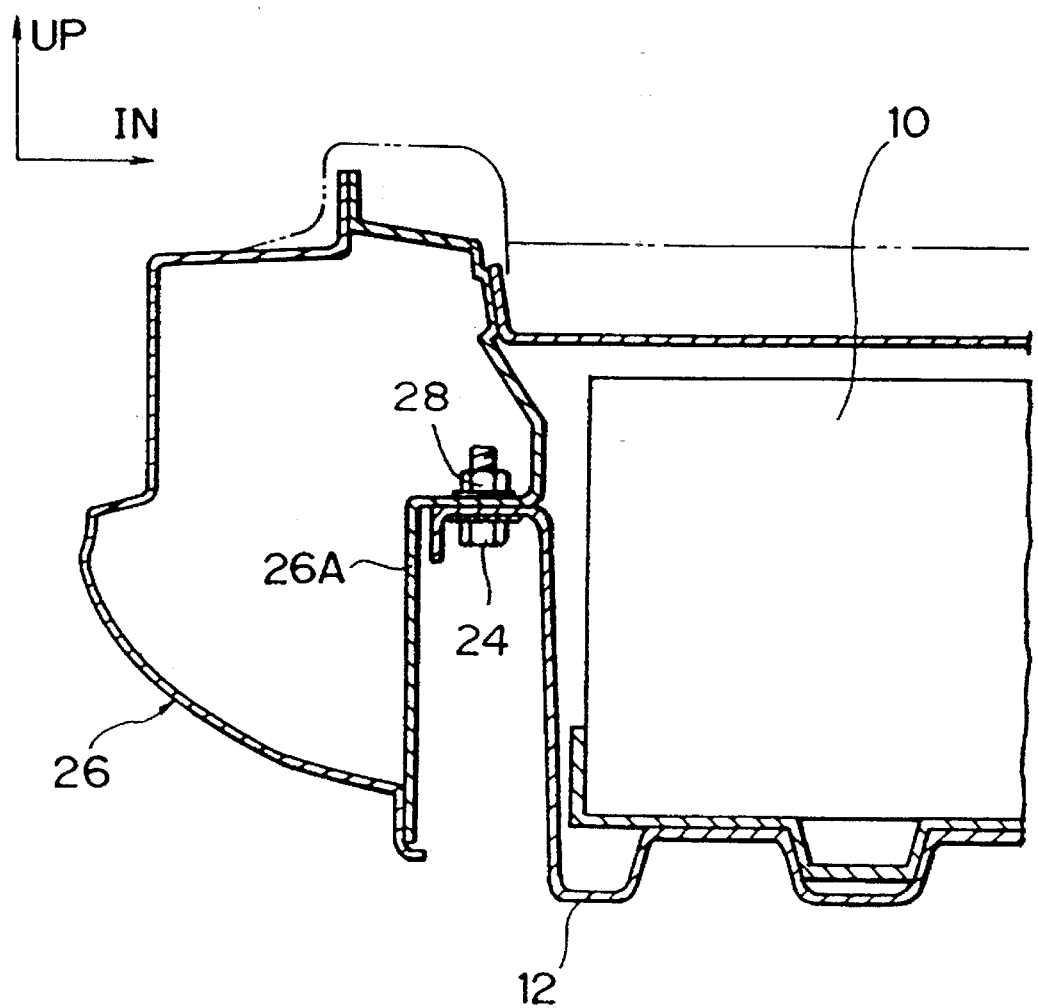
FIG. 3 is a partial cross-sectional view, showing a supporting structure for the battery carrier for the vehicle in accordance with the first embodiment.
Figure 4:
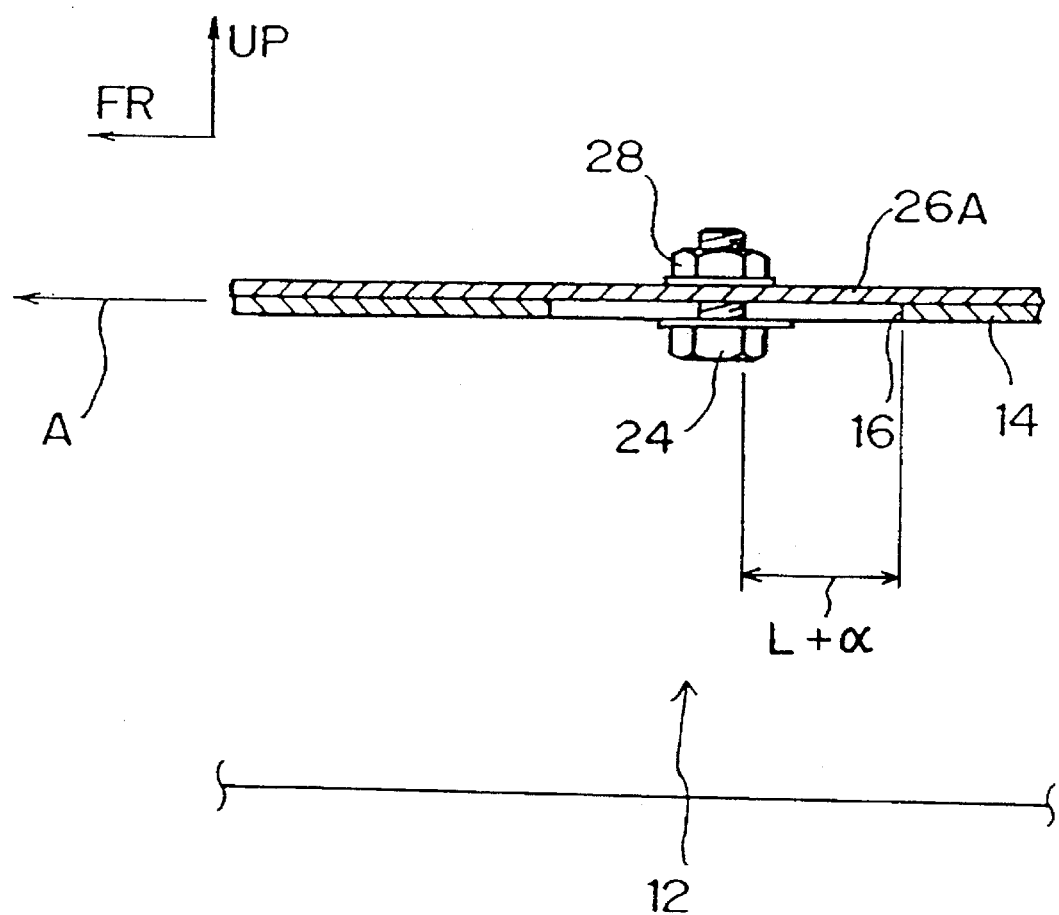
FIG. 4 is a cross-sectional side view, showing the supporting structure for the battery carrier for the vehicle in accordance with the first embodiment.
Figure 7:
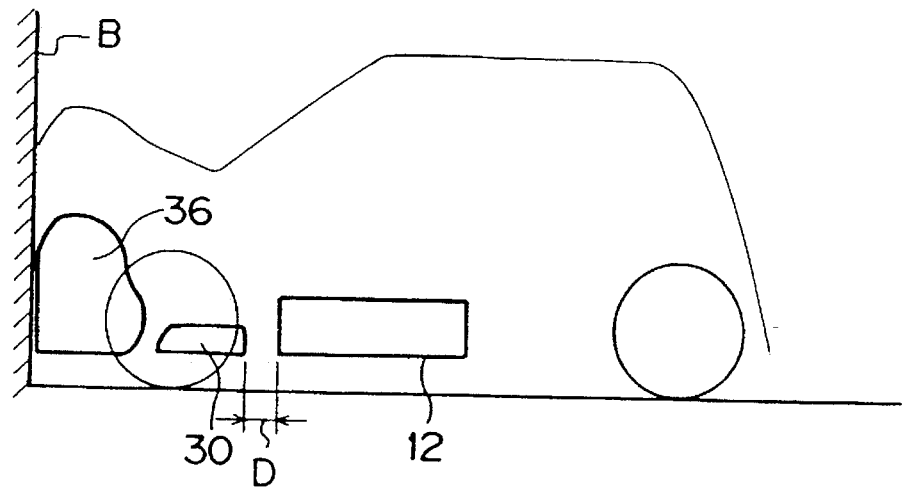
FIG. 7 is a side view, showing a positional relationship between the motor, the sub-frame, and the battery carrier for the vehicle according to the first embodiment immediately before the vehicle collides with the barrier.
Figure 8:
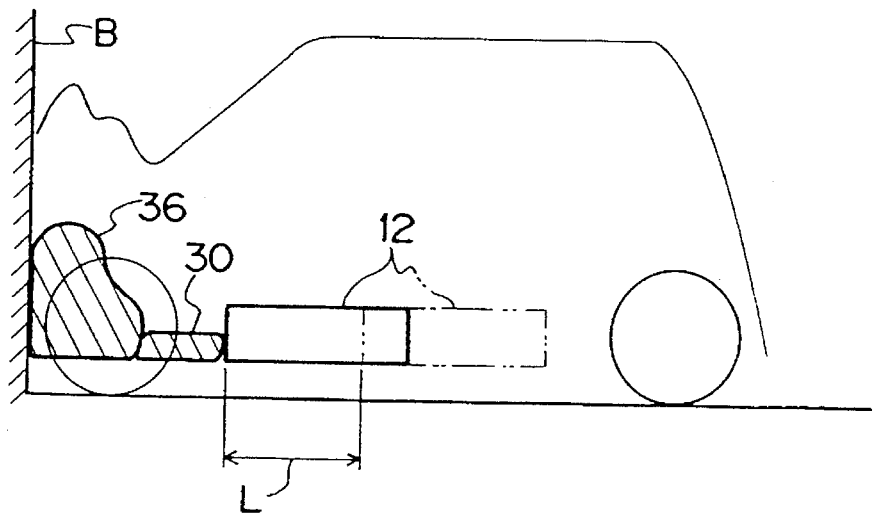
FIG. 8 is a side view, showing moved positions of the motor, the sub-frame, and the battery carrier for the vehicle according to the first embodiment after the vehicle collides with the barrier.

As shown in FIG. 3, a bolt 24 is provided through each elongate hole 15 from the underside of the flange portion 14. The bolt 24 is secured by a weld nut 28 which is welded to an inner plate 26A of a side sill 26. The battery carrier 12 is thus mounted to the side sill 26 by a predetermined tightening force via the bolts 24 and the weld nuts 28. Furthermore, FIG. 4 depicts a hole length (L+α) of the elongate hole 16, which extends in the longitudinal direction of the vehicle. This hole length corresponds to a distance in which the battery carrier 12 is allowed to move, i.e., until the bolt 24 impinges on a rear edge portion of the elongate hole 16. This distance is established slightly greater in length than the relative movement amount L of the battery carrier 12. As shown in FIGS. 7 and 8, this relative movement amount L is the amount in which the battery carrier 12 is allowed to move after a front collision of the electric vehicle with a barrier B. That is, after the electric vehicle collides with the barrier B, the battery carrier 12 dislodges from the vehicle body 8. The front surface portion of the battery carrier 12 then strikes against the sub-frame 30 which in turn bumps into and stops against the motor 36 or the reduction gear 38. Kinetic energy of the battery carrier 12 is thereby prevented from being transmitted to the vehicle body 8.

Figure 10:
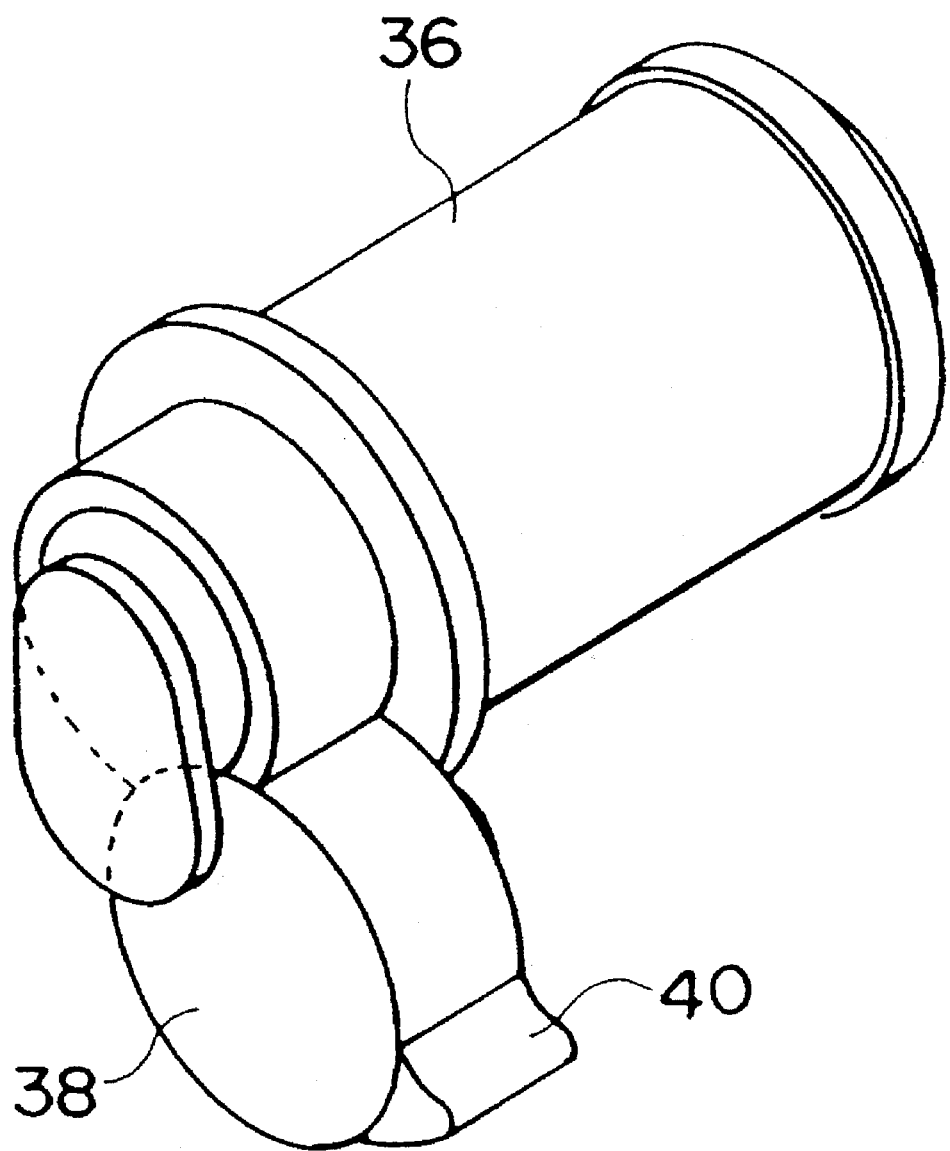
FIG. 10 is a perspective view, illustrating a rib member which is formed on a reduction gear for transferring driving force from the motor of the electric vehicle in accordance with the first embodiment.
Figure 12:
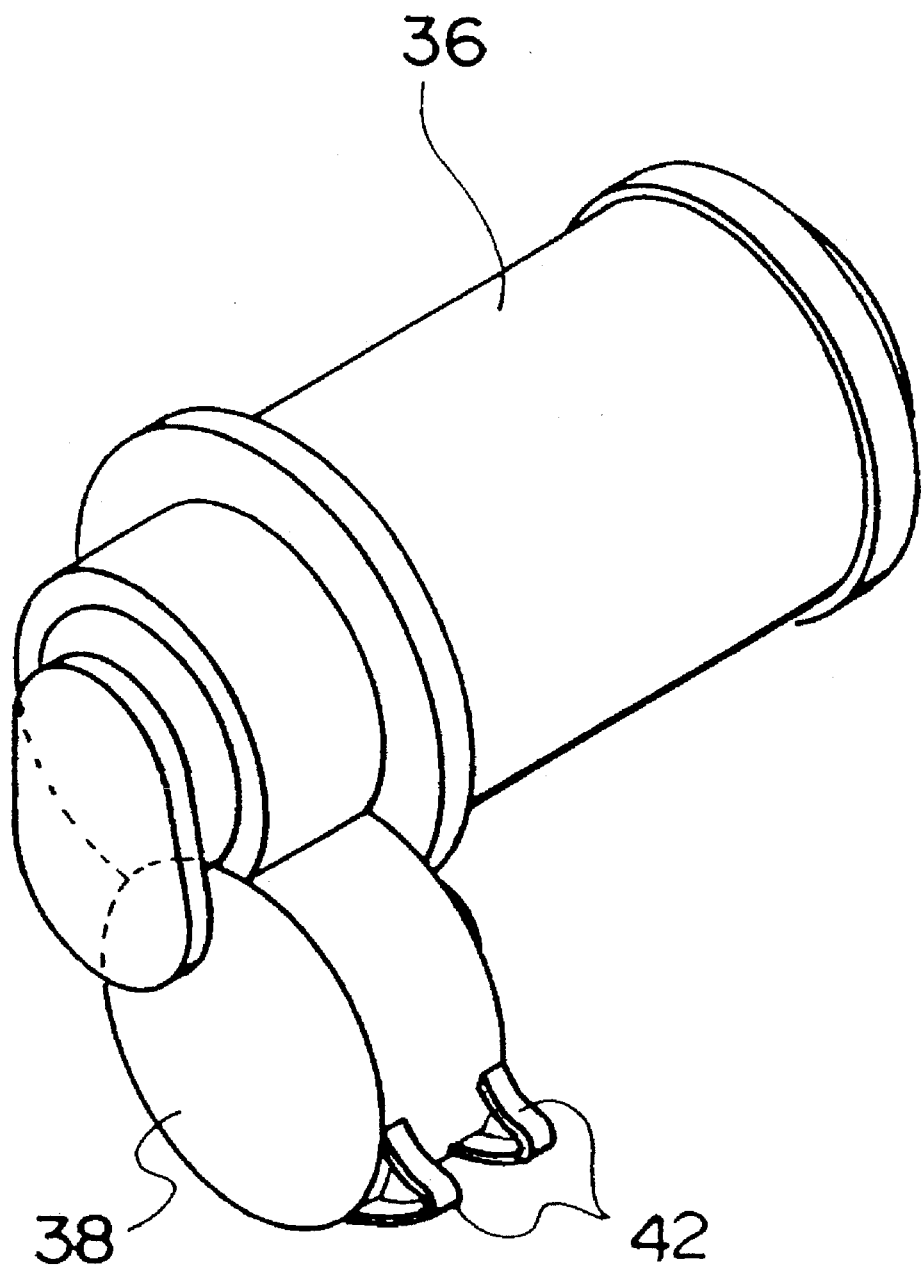
FIG. 12 is a perspective view, illustrating a variant example of the rib member that is formed on the reduction gear for transferring the driving force from the motor of the electric vehicle in accordance with the first embodiment.

Referring now to FIG. 10, the cylindrical-shaped reduction gear 38 for transferring the driving force from the motor 36 is provided with a rib portion 40 at a lower side thereof, which extends outwardly from the outer-circumferential surface of the reduction gear 38. As shown in FIG. 11, the rib portion 40 is disposed so that one surface portion 40A of the rib portion 40, which is directed in the rearward direction of the vehicle body 8, lies coextensive horizontally with a vertical surface of a protuberance portion 30A of the sub-frame 30. This ensures that the sub-frame 30, which is forced to move toward the reduction gear 38 upon the collision of the vehicle, is held by the reduction gear 38, with a beveled surface 30B of the sub-frame 30 being guided along the outer-circumferential surface of the reduction gear 38. The sub-frame 30 is thereby prevented from being driven underneath the reduction gear 38. Alternatively, as illustrated in FIG. 12, the reduction gear 38 may be provided with a pair of rib portions 42, which project outwardly therefrom and spaced apart from each other by a predetermined distance to hold the protuberance portion 30A of the sub-frame 30 therebetween. Furthermore, the rib portion 40 or the pair of rib portions 42 may be provided on the body of the motor 36 instead of on the reduction gear 38.

Figure 5:
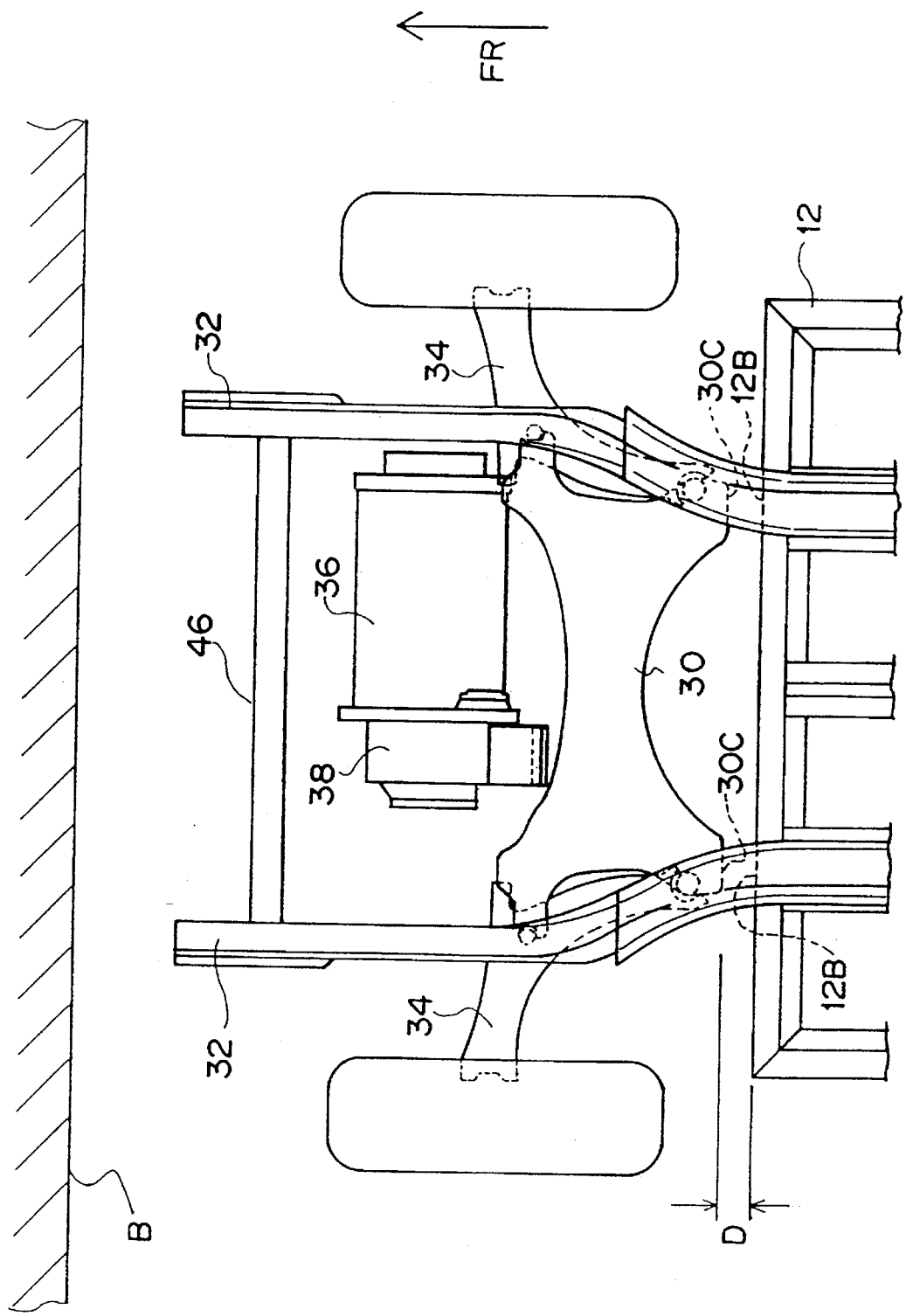
FIG. 5 is a plan view, illustrating a positional relationship between a motor, a sub-frame, and the battery carrier for the electric vehicle according to the first embodiment immediately before the vehicle collides with a barrier.
Figure 13:
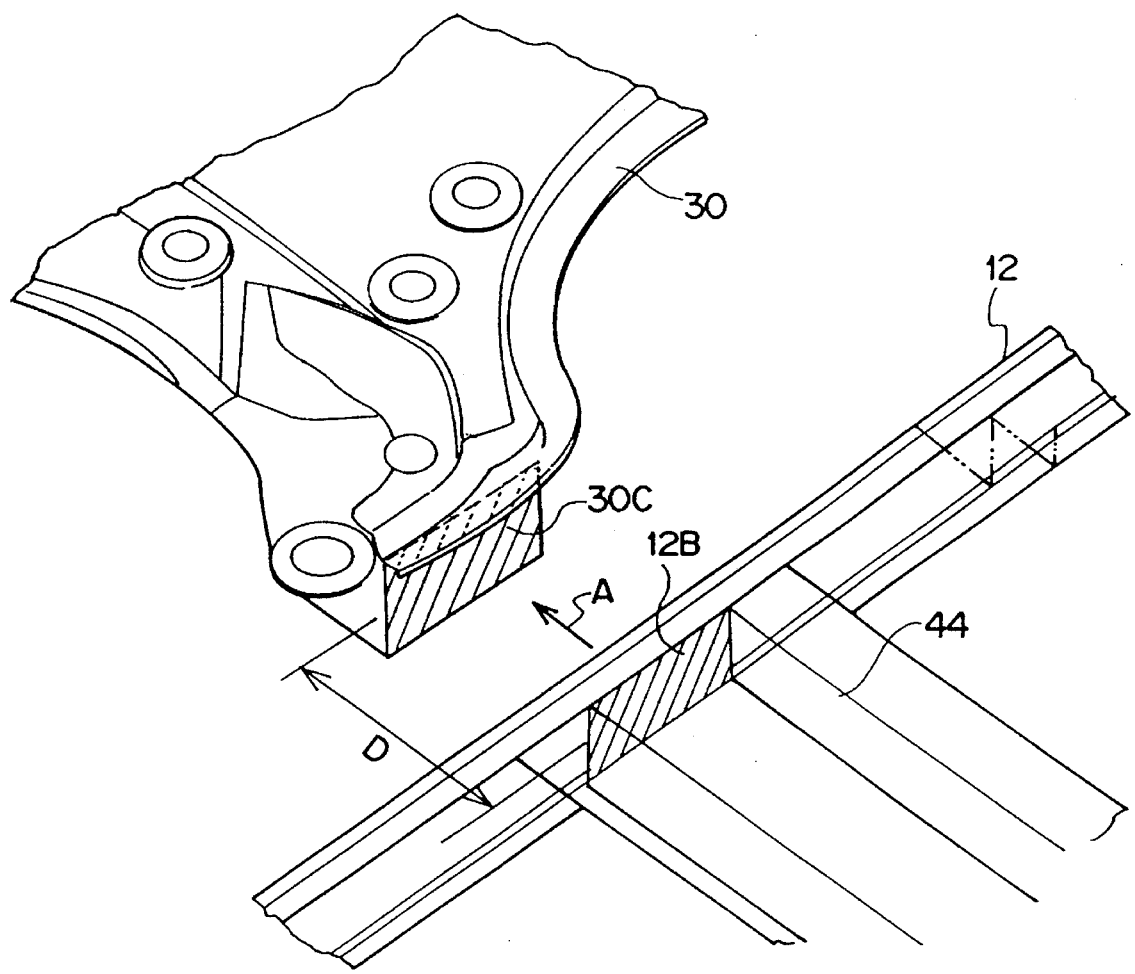
FIG. 13 is a perspective view, showing impact surface portions of the sub-frame and the battery carrier of the electric vehicle according to the first embodiment.

Referring now to FIGS. 5 and 13, the sub-frame 30 is formed with a pair of planar surface portions 30C facing in the rearward direction of the vehicle. In order to ensure that the kinetic energy of the battery carrier 12 is transmitted to the sub-frame 30, the sub-frame 30 is disposed such that the planar surface portions 30C strike against the front surface portions 12B of beam members 44 that constitute the battery carrier 12.

Next, it will be described how the kinetic energy of the battery carrier containing batteries is absorbed without being transmitted to the vehicle body upon a frontal collision of the electric vehicle according to the present invention.

With reference to FIG. 9, upon a frontal collision of the vehicle, the battery carrier 12 is urged to move (in the direction of arrow A) by inertial force to consume kinetic energy thereof which had been sustained immediately before the collision.

Although the tightening force of the bolt 24 and the weld nut 28, as illustrated in FIG. 4, generates frictional force between the flange portion 14 of the battery carrier 12 and the side sill 26, the battery carrier 12 will slide when the above-noted kinetic energy exceeds such frictional force. With the bolts 24 still holding the battery carrier 12, the battery carrier 12 is thereby dislodged from a state of being secured to the vehicle body 8. While being guided by the elongate holes 16, the battery carrier 12 is forced to move in the forward direction of the vehicle body 8. At this stage, no kinetic energy is substantially transmitted from the battery carrier 12 to the vehicle body 8. Now, for the convenience of description, a moving state of the battery carrier 12 with kinetic energy thereof retained therein, in which no kinetic energy is substantially conducted from the battery carrier 12 to the vehicle body 8, is herein defined as being in a free-running state.

Figure 6:
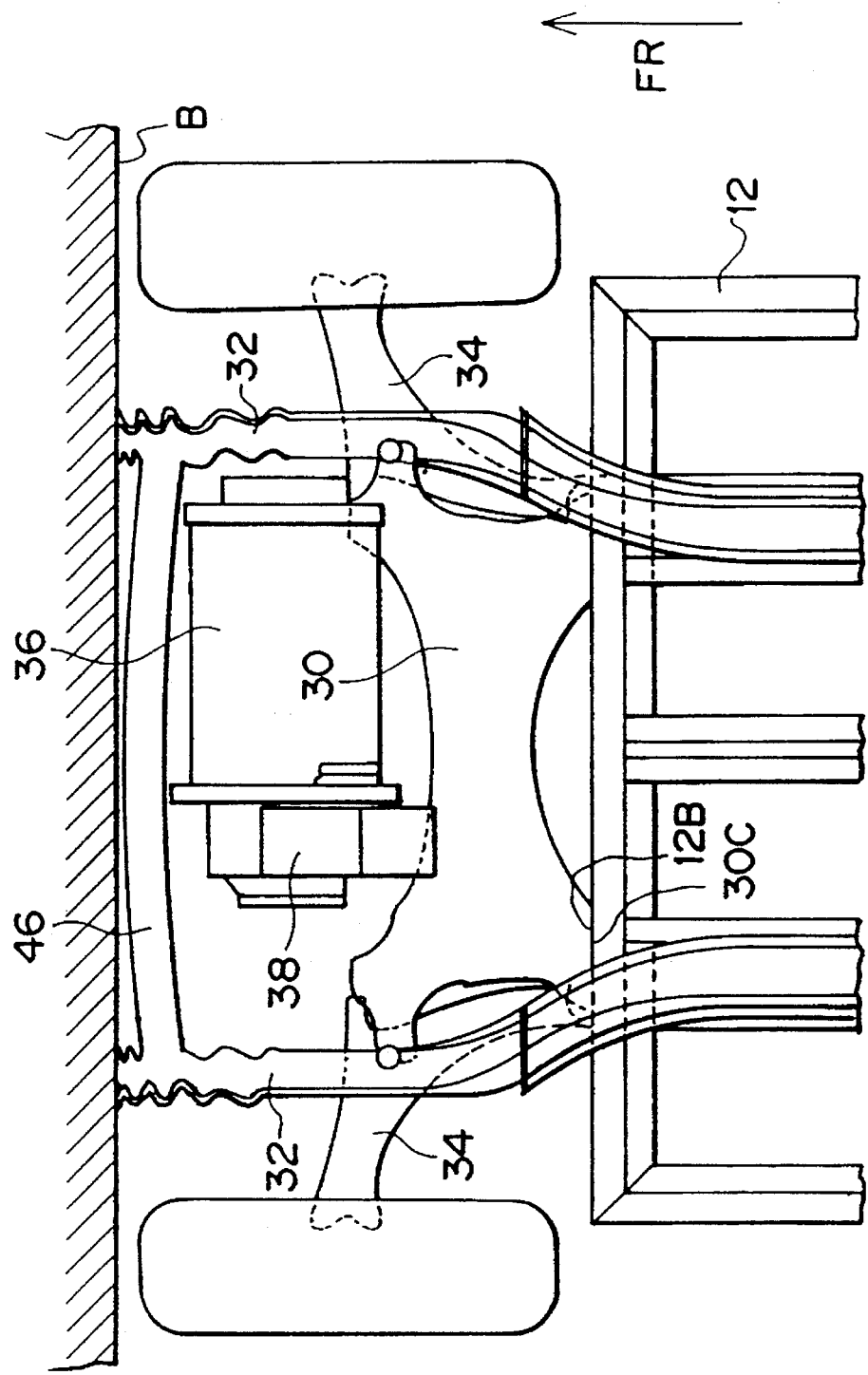
FIG. 6 is a plan view, showing moved positions of the motor, the sub-frame, and the battery carrier for the electric vehicle according to the first embodiment after the vehicle stops through the collision with the barrier.

As illustrated in FIGS. 6 and 8, while the battery carrier 12 is in such a free-running state, the front-side members 32, a cross-member 46, and the like in the vehicle body 8, which is in collision with an impact object, for example, the barrier B, are crushed so as to absorb kinetic energy of the vehicle body 8. (At this time, the weight of the batteries 10 and the battery carrier 12 are not applied to the vehicle body 8.) The movement of the motor 36 and the reduction gear 38, which serve as in-vehicle components, stop by the collision with barrier B. The sub-frame 30 deforms and movement thereof is stopped by striking against the reduction gear 38. Note that the sub-frame 30 is held by the rib portion 40 that is provided on the reduction gear 38, so as not to be driven under the reduction gear 38. (See FIG. 10.)

The battery carrier 12 next strikes against the sub-frame 30, which remains collapsed against barrier B. As previously described, each elongated hole 16, formed in the battery carrier 12, has a hole length (L+α) which permits the battery carrier 12 to be in a free-running state until stopped by striking against the sub-frame 30. In addition, the hole length is larger in length than the relative movement amount L, in which the battery carrier 12 is permitted to move until stopping by striking against the sub-frame 30. Accordingly, no interruption occurs during the movement of the battery carrier 12, and no kinetic energy is transferred therefrom to the vehicle body 8. Furthermore, referring back to FIG. 6, when the battery carrier 12 bumps against the sub-frame 30, the front surface portions 12B of the beam members 44 of the battery carrier 12 strike against the pair of planar surface portions 30C of the sub-frame 30. The kinetic energy of the battery carrier 12 is thereby securely transmitted to the sub-frame 30 without dispersal.

In this way, the battery carrier 12, which is dislodged from the vehicle body 8 upon collision of the front body thereof, is held in a free-running state until being stopped by the crush of the vehicle body 8. Then, the kinetic energy of the battery carrier 12 is absorbed by the sub-frame 30 which stops by striking against barrier B. Accordingly, no kinetic energy is transmitted therefrom to the vehicle body 8. As a result, there is no need for increasing strength of the front-side members 32 and the like in order to absorb additional impact force acting on the vehicle body 8, which corresponds to an increase in body weight by the batteries 10 disposed in the vehicle. Consequently, a lighter-weight electric vehicle is achievable.

A second embodiment will now be described.

Figure 14:
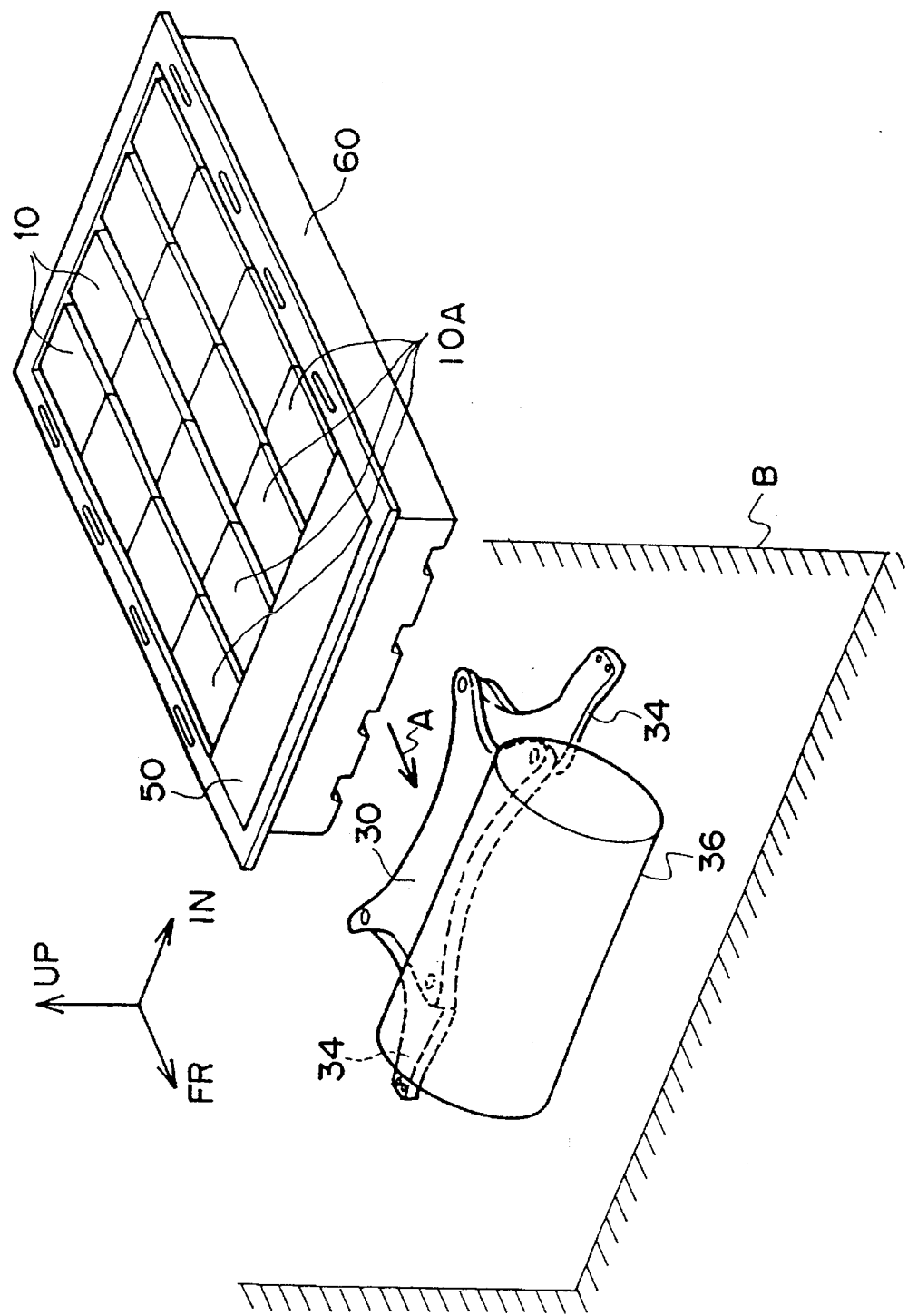
FIG. 14 is a perspective view, illustrating a positional relationship between a motor, a sub-frame, and a battery carrier of an electric vehicle in accordance with a second embodiment immediately before the vehicle collides with a barrier.

Referring to FIG. 14, an electric vehicle in accordance with the present embodiment is provided with an battery carrier 60, which has an urethane material 50, serving as an energy-absorbing means fitted into a front space portion of the battery carrier 60. Some of the kinetic energy of the battery carrier 60 is thereby absorbed by the battery carrier 60 itself, and not all being transmitted to a sub-frame 30, when the battery carrier 60 strikes against the sub-frame 30 which remains stopped by a collision, as described in the first embodiment. As a result, possible damage of the batteries 10 can be minimized. Note that the energy-absorbing means is not limited to the urethane material 50; alternatively, batteries 10A, which are arranged in the front row of the battery carrier 60, may be made of less rigid material so as to absorb the kinetic energy of the battery carrier 60.

Figure 15:
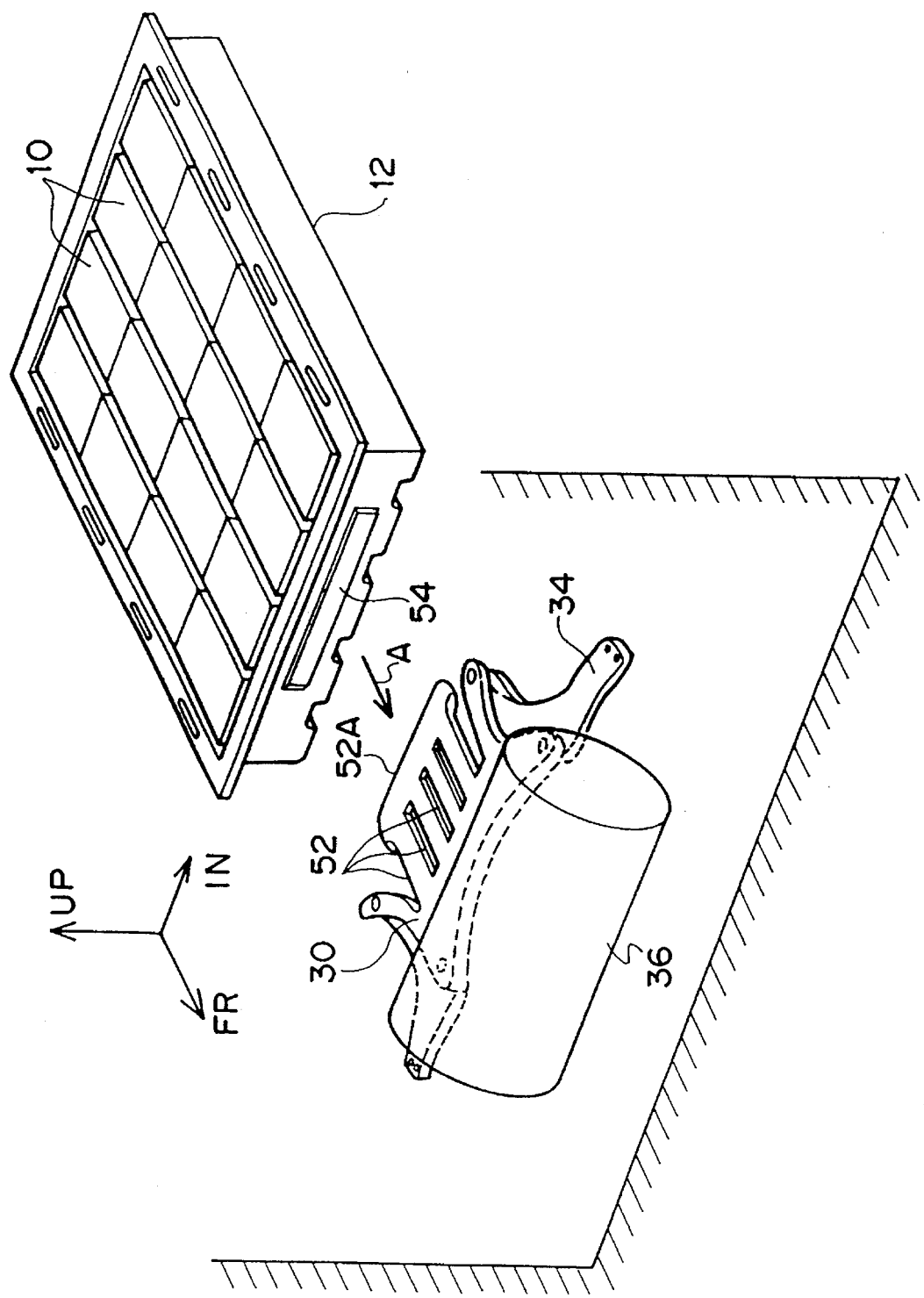
FIG. 15 is a perspective view, showing a positional relationship between a motor, a sub-frame, and a battery carrier of an electric vehicle in accordance with a variant example of the second embodiment immediately before the vehicle collides with the barrier.

Furthermore, as shown in FIG. 15, the sub-frame 30 may be formed with cut-out portions 52 at a rear portion thereof to make that portion more pliable. The battery carrier 12 has an impact surface portion 54 which projects form a front surface portion of the battery carrier 12. At the time of a front-end collision of the electric vehicle, the forward movement of the sub-frame 30 is stopped, and the impact surface portion 54 of the free-running battery carrier 12 strikes against a rear edge portion 52A of the sub-frame 30 to further crush the sub-frame 30. The rear edge portion 52A of the sub-frame 30 thereby absorbs kinetic energy from the battery carrier 12.

Next, a third embodiment will be described.

According to the present embodiment, kinetic energy of a battery carrier 12, which is in a free-running state for a given period of time, is absorbed without allowing the battery carrier 12 to strike against a sub-frame 30, until a vehicle body 8 stops through a collision.

Figure 16:
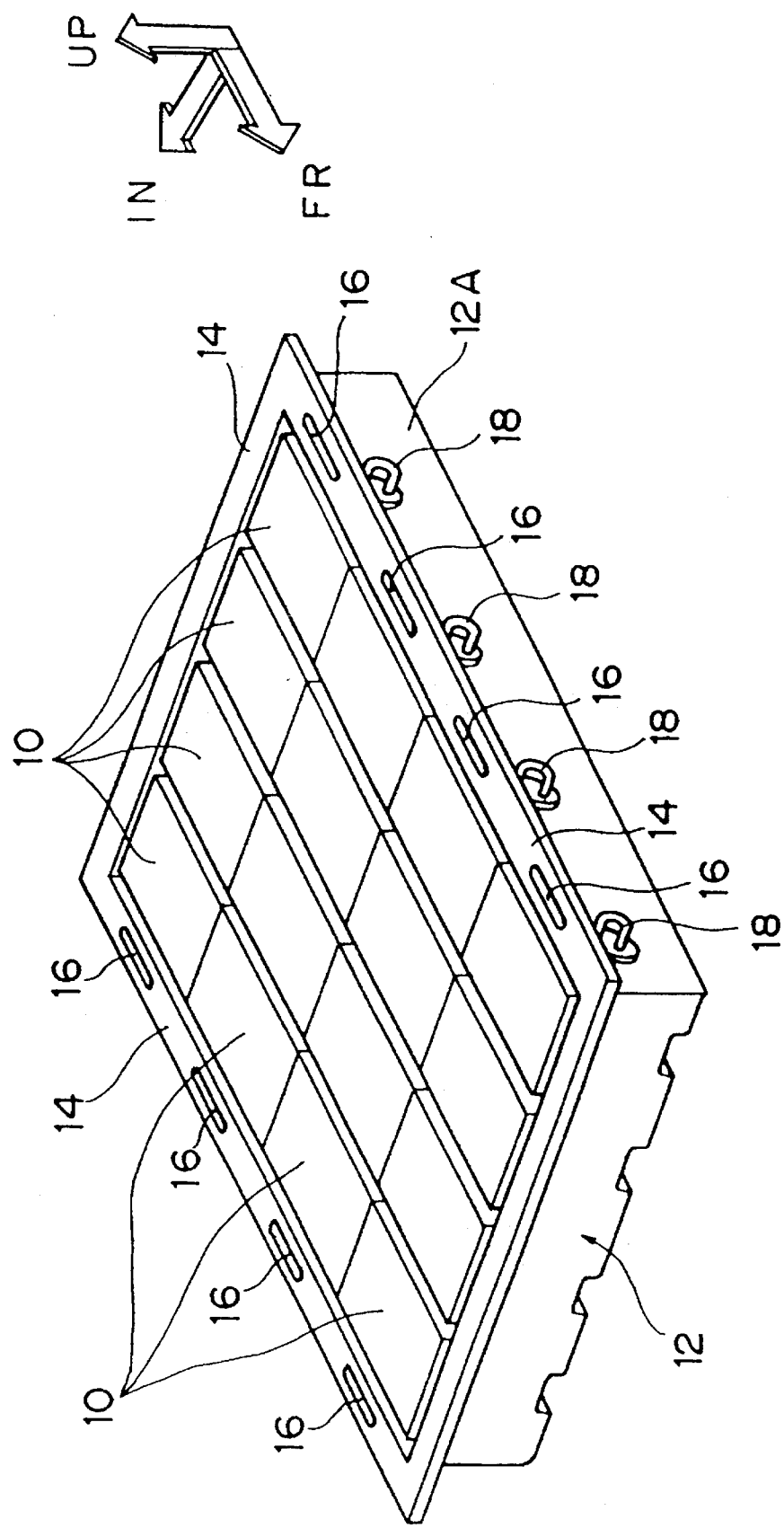
FIG. 16 is a perspective view, showing a battery carrier for an electric vehicle in accordance with a third embodiment.

As illustrated in FIG. 16, the battery carrier 12 is provided with energy-absorbing guide members 18 on each side surface portion 12A thereof. Each of the energy-absorbing guide members 18 is made of a steel bar, which is folded to form a substantially U-shape. The energy-absorbing guide members 18 are fixed to a side surface portion 12A of the battery carrier 12 in such a way as to be positioned in front of end portions of elongate holes 16 in the forward direction of the vehicle body 8.

Figure 17:
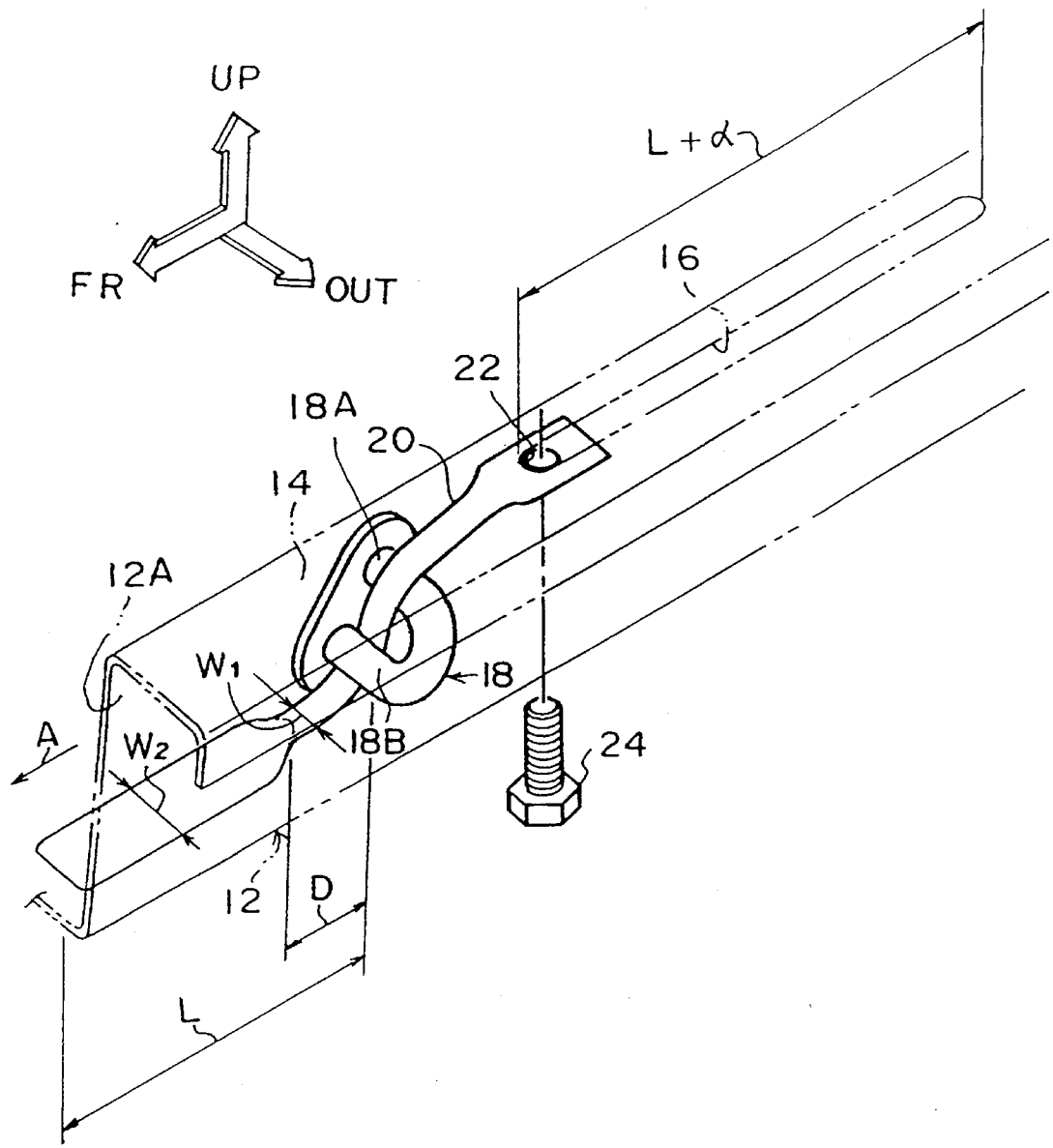
FIG. 17 is a partly perspective view, showing an energy-absorbing plate for the electric vehicle according to the third embodiment.
Figure 18:
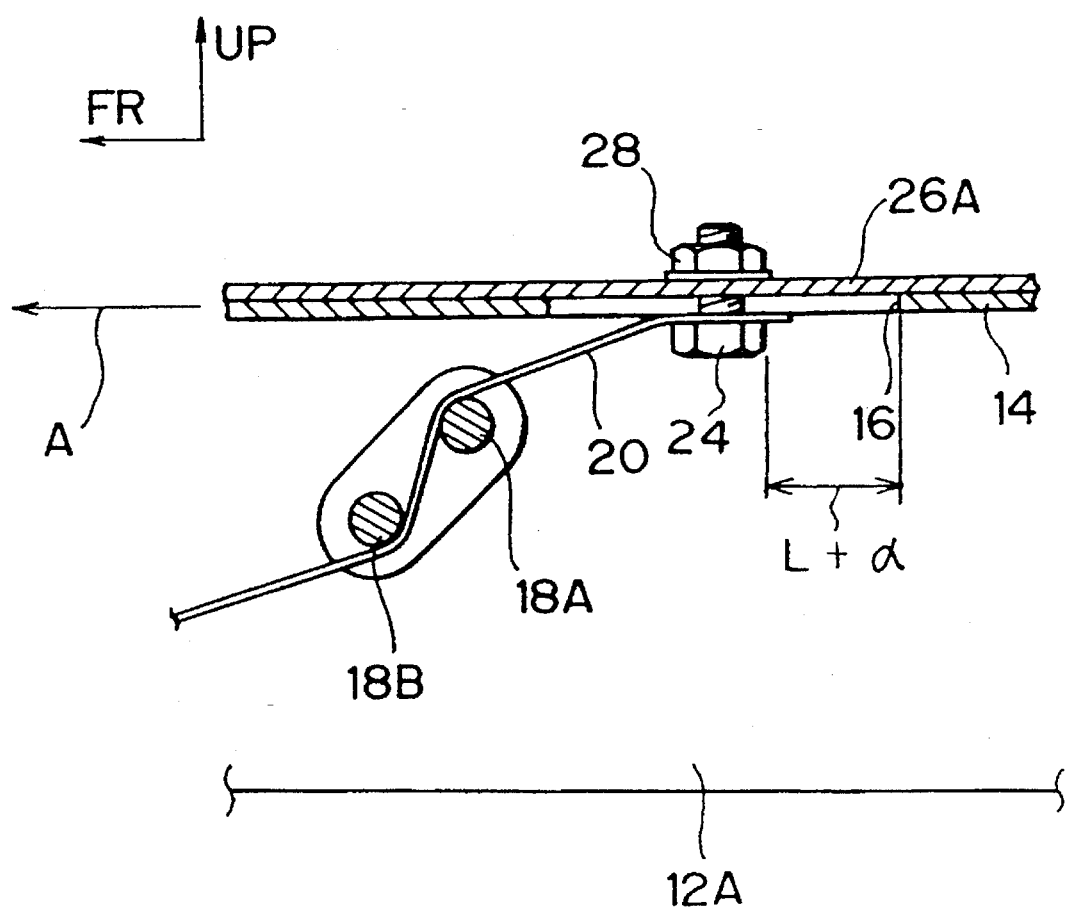
FIG. 18 is a detailed cross-sectional view, illustrating a deformed state of the energy-absorbing plate of the electric vehicle according the third embodiment.

FIGS. 17 and 18 illustrate the energy-absorbing guide 18, which includes an upper-supporting portion 18A and a lower-supporting portion 18B, which are formed in parallel to each other. The energy-absorbing guide member 18 is disposed so that the upper-supporting portion 18A is positioned behind the lower-supporting portion 18B in the rearward direction of the vehicle body 8. An energy-absorbing plate 20, which has small thickness, is provided through a gap between the upper-supporting and lower-supporting portions 18A and 18B of the energy-absorbing guide member 18, so as to be forced into contact with the outer-circumferential surface portions of the upper-supporting and lower-supporting portions 18A and 18B. The energy-absorbing plate 20, which is formed of a plastically deformable material, has a mounting hole 22 punched at an end surface portion thereof in the rearward of the vehicle body 8. A bolt 24 extends from the underside of the vehicle body 8 up through an elongate hole 16 and the mounting hole 22. The bolt 24 is secured by a weld nut 28 which is welded to an inner plate 26A of a side sill 26. The battery carrier 12 is thereby held to the side sill 26 by a predetermined tightening force by means of the bolt 24 and the weld nut 28, with the energy-absorbing plate 20 being anchored at one end to the side sill 26 by the bolt 24.

The energy-absorbing plate 20 has a lower rigid portion of smaller width $W_1$ and a rigid portion of larger width $W_2$. The lower rigid portion extends from the mounting hole 22 to a substantially intermediate portion of the energy-absorbing plate 20, while the rigid portion extends therefrom to a leading edge portion of the energy-absorbing plate 20. Free-running distance D, which will be described herein afterwards, is substantially equal to a length which extends from one position, at which this smaller width $W_1$ portion of the energy-absorbing plate 20 is forced into contact with the outer-circumferential surface portion of the lower-supporting portion 18B, to another position at which the narrow width $W_1$ portion turns to the above larger width $W_2$ portion. In addition, a length, which extends from the above-mentioned one position to the leading edge portion of the energy-absorbing plate 20, corresponds to relative movement amount L of the battery carrier 12.

Furthermore, the length (L+α) of the elongate hole 16 is set slightly longer than the relative movement amount L of the battery carrier 12, in order that the energy-absorbing plate 20 is allowed to absorb most of the kinetic energy of the battery carrier 12 to avoid transferring the kinetic energy directly to the vehicle body 8.

It will now be described how the kinetic energy of the battery carrier having batteries disposed therein is absorbed without transmission to the vehicle body upon the collision of a front body of the electric vehicle according to the present embodiment.

Figure 19:
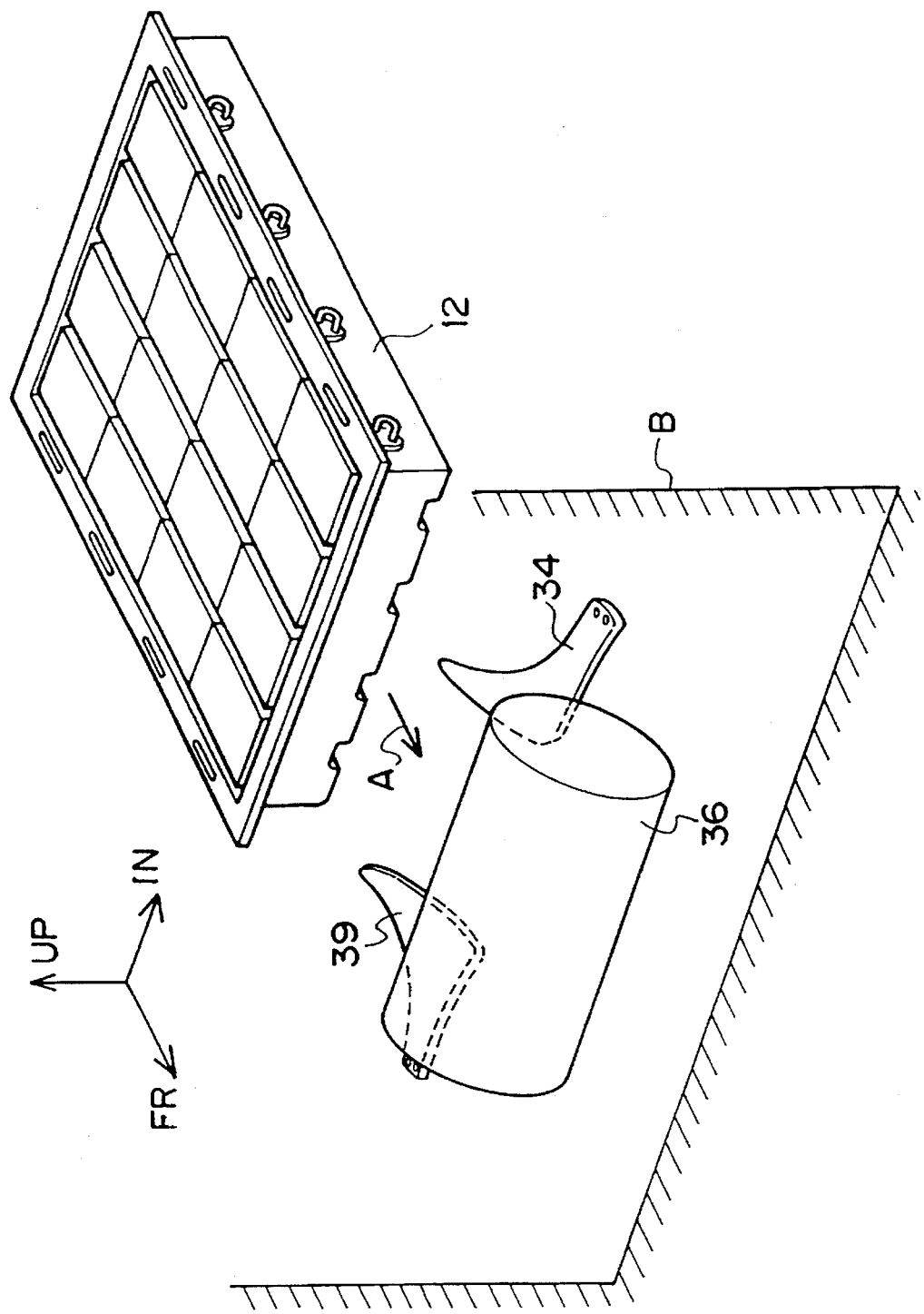
FIG. 19 is a perspective view, illustrating a positional relationship between the motor and the battery carrier of the electric vehicle according to the third embodiment immediately before the vehicle collides with the barrier.

As illustrated in FIG. 19, when the front body of a vehicle without a sub-frame provided therein is in a collision, the battery carrier 12 is urged into movement (in the direction of arrow A) by an inertial force, so as to consume kinetic energy thereof which was being sustained immediately before the collision occurs.

The tightening force of the weld nut 28 and the bolt 24, as illustrated in FIG. 18, generates frictional force between a flange portion 14 of the battery carrier 12 and the side sill 26. However, the battery carrier 12 will slide when the kinetic energy of the battery carrier 12 exceeds the above frictional force. With the bolt 24 holding the battery carrier 12, the battery carrier 12 is thereby dislodged from a state of being secured to the vehicle body 8. While guided along the elongate holes 16, the battery carrier 12 is then forced to move in the forward direction of the vehicle body 8.

At this time, as illustrated in FIG. 17, the upper-supporting and lower-supporting portions 18A and 18B of the energy-absorbing guide member 18, which is provided on the side surface portion 12A of the battery carrier 12, scrape against the Front side and reverse side portions of the energy-absorbing plate 20, one end portion of which is anchored to the side sill 26. However, little scraping and bending will occur at the narrow width $W_1$ portion, which causes the battery carrier 12 to be substantially in a free-running state. Thus, no kinetic energy is transferred from the battery carrier 12 to the vehicle body 8.

In this way, while the battery carrier 12 is in a free-running state, the vehicle body 8, which has collided with an impact object, for example, the barrier B, is crushed to absorb the kinetic energy of the vehicle body 8. (At this time, the weight of the batteries 10 and the battery carrier 12 are not applied to the vehicle body 8.)

When the battery carrier 12 is urged into further forward movement, both surface portions of the upper-supporting and lower-supporting portions 18A and 18B of the energy-absorbing guide member 18 scrape against the larger width $W_2$ portion of the energy-absorbing plate 20. This results in a greater resistance to scraping and bending, thereby permitting the kinetic energy of the battery carrier 12 to be absorbed and consumed for conversion into the force of deforming the energy-absorbing plate 20. Accordingly, impact kinetic energy, which increases with an increase in weight due to the batteries 10 loaded in the vehicle, is prevented from being conducted to the vehicle body 8. As a result, no increase in the strength of the front-side members and the like is required, which allows for a lighter-weight electric vehicle.

Next, one example of experimental results will be described with reference to the graph of FIG. 20, in order to determine how much the kinetic energy of the battery carrier 12 was absorbed with the above structure in accordance with the present embodiment.

Figure 20:
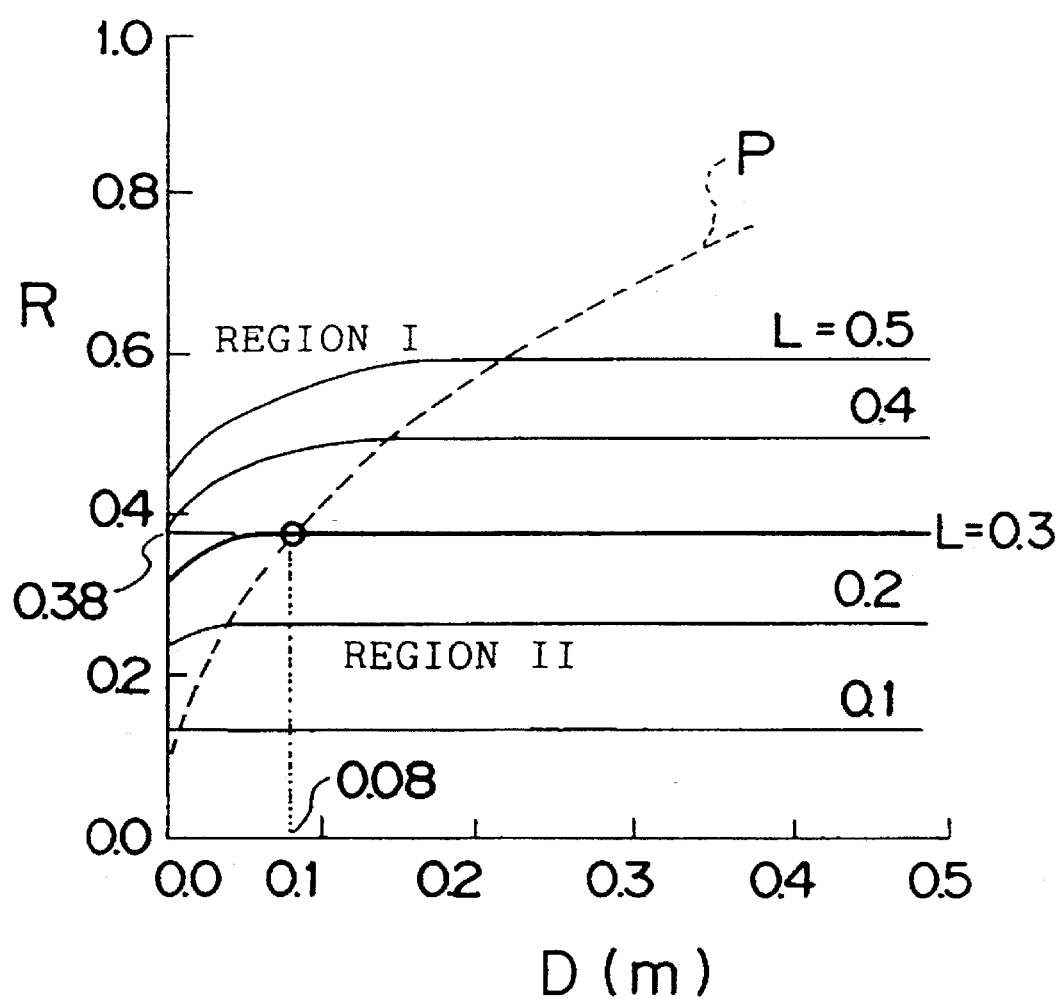
FIG. 20 is a graphic illustration, indicating a correlation between a free-running distance, relative movement amount, and an in-vehicle energy-absorbing efficiency of the battery carrier of the electric vehicle according to the third embodiment.

Although "D(m)" in FIG. 20 indicates a free-running distance, it does not refer to a distance at which the battery carrier 12 is actually permitted to be held in a free-running state until kinetic energy thereof is absorbed. For convenience of experimentation, "D(m)" herein shows a distance at which the energy-absorbing guide member 18 scrapes against the smaller width $W_1$ portion of the energy-absorbing plate 20 before the kinetic energy of the battery carrier 12 is absorbed, as shown in FIG. 17.

"R" represents an in-vehicle energy absorption efficiency (A/E), indicating a value produced from absorbed kinetic energy amount A divided by kinetic energy E ($\frac{1}{2}\times m v^2$: m=mass of the battery carrier and batteries; and, V=collision velocity), kinetic energy E being the kinetic energy that had been retained in the battery carrier 12 the before collision occurred.

Furthermore, "L(m)" represents a relative movement amount of the battery carrier 12 with respect to the vehicle body 8, in which the battery carrier 12 was moved after being released from a state of being secured to the vehicle body 8. (See FIG. 17.)

Region "I" shows a range in which the kinetic energy of the battery carrier 12 was absorbed through the deformation of the energy-absorbing plate 20 by the energy-absorbing guide member 18 of the battery carrier 12 after the vehicle body 8 stopped due to a collision with barrier B. Region "II" indicates a range in which the kinetic energy of the battery carrier 12 was absorbed through the deformation of the energy-absorbing plate 20 by the energy-absorbing guide member 18 of the battery carrier 12 after the vehicle body 8 collided with barrier B until the battery carrier 12 stopped. Thereafter, the vehicle body 8 came to a stop. Regions I and II are divided into two parts by curve P, as shown by a dashed line. This curve P represents a divergent point of economical cost. To be specific, in region II, the inertial force of the battery carrier 12 increases with an increase in free-running distance D, thereby producing additional kinetic energy which acts on the vehicle body 8. Thus, an increase in the strength of the front-side members and the like is required for absorption of such additional kinetic energy. Referring to region I, in which in-vehicle energy-absorbing efficiency R decreases with a reduction in free-running distance D.

Thus, in view of energy absorption efficiency, weight, and cost, curve P indicates an optimum value of the free-running distance D of the battery carrier 12 with respect to the relative movement amount L.

Now, assuming that the relative movement amount L of the battery carrier 12 is determined to be 0.30 meters, for example, with the layout and the like of the vehicle body 8 taken into account, the optimum value of the free-running distance D in view of the in-vehicle energy absorption efficiency R, cost, and the like must be set at 0.08 meters according to curve P. That is, in view of cost, a correlation between the in-vehicle energy absorption efficiency R, the free-running distance D, and the relative movement amount L of the battery carrier can be estimated to some extent.

Note that a means for holding the battery carrier 12 to the underside of the vehicle body 8 is not limited to the bolt 24 and the weld nut 28, but may include a resin capsule, which is fitted between the elongate hole 16 and an upper end portion of the bolt 24 so as to break away in flakes when a given inertial force is exerted thereon. That is, any alternative means, which is adapted to release restraint on movement of the battery carrier 12 with a given inertial force, is applicable without being limited to the present embodiment.

Figure 21:
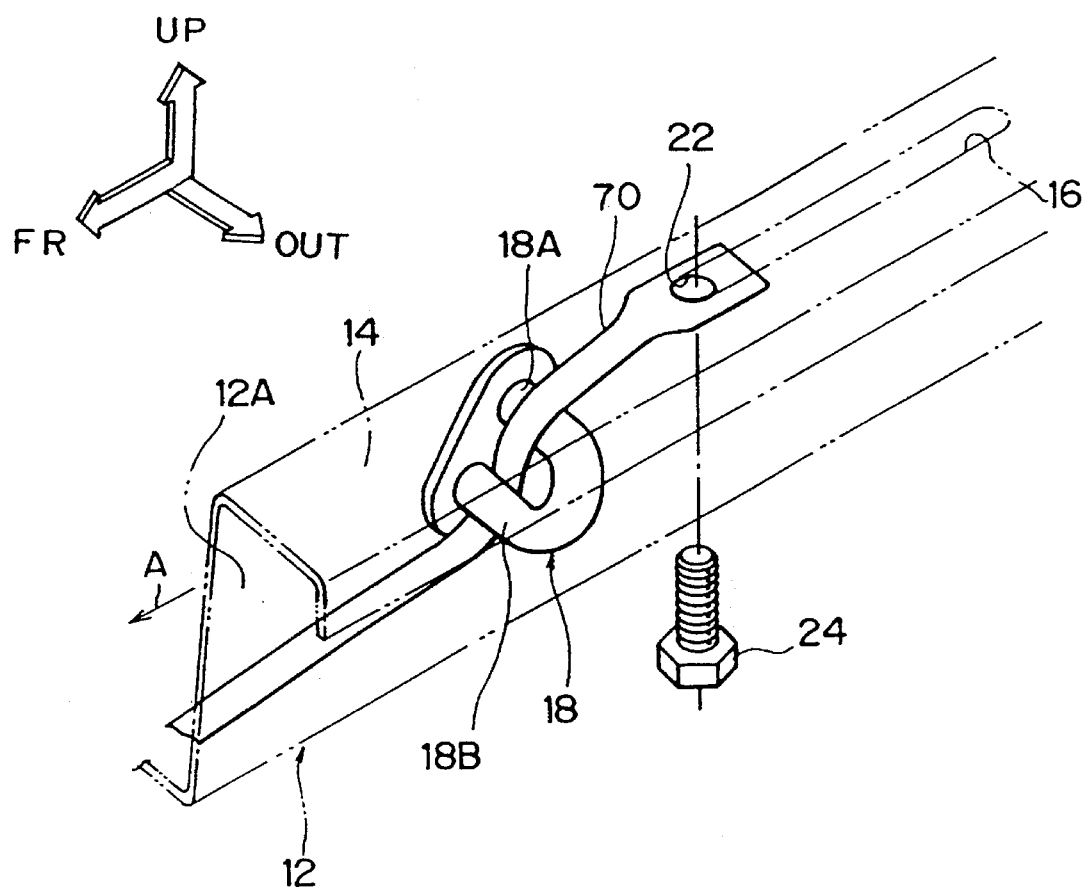
FIG. 21 is a partial perspective view, illustrating an energy-absorbing plate of an electric vehicle according to a fourth embodiment.

A fourth embodiment will now be described with reference to FIG. 21.

According to the present embodiment, a battery carrier 12 is provided with an energy-absorbing plate 70 for absorbing the kinetic energy thereof in a manner similar to the third embodiment.

The energy-absorbing plate 70 has a width which corresponds to somewhere between widths $W_1$ and $W_2$ of the energy-absorbing plate 20 according to the third embodiment. An energy-absorbing guide member 18, which is provided on a side surface portion 12A of the battery carrier 12, includes an upper-supporting portion 18A and a lower-supporting portion 18B. One end portion of the energy-absorbing plate 70 is fixed to a side sill. The upper-supporting and lower-supporting portions 18A and 18B are forced to move in the forward direction of the vehicle body 8 (in the direction of arrow A), while continuously flexing the energy-absorbing plate 70 by scraping against both side surface portions thereof. The kinetic energy of the battery carrier 12 is thereby absorbed and consumed for conversion into the force of deforming the energy-absorbing plate 70. As a result, the impact kinetic energy, which increases with an increase in weight due to the batteries 10 loaded in the vehicle, can be absorbed by the energy-absorbing plate 70 for a short time, thereby minimizing the transfer of kinetic energy therefrom to the vehicle body 8.

Next, fifth through seventh embodiments according to the present invention will be described.

Note that the same reference characters are hereinafter given for members common to those described in the first through fourth embodiments; therefore, descriptions related thereto will be omitted.

Figure 22:
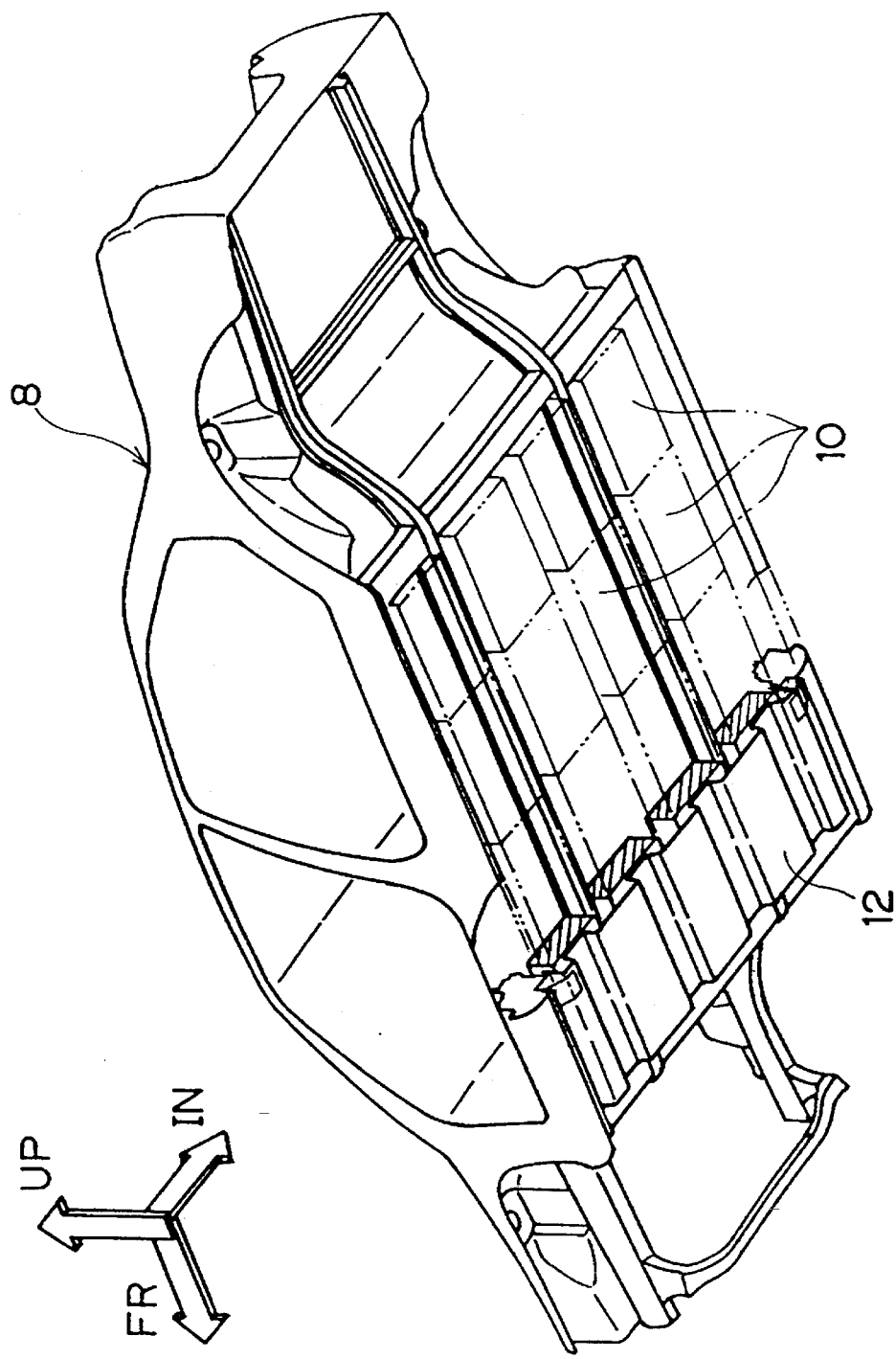
FIG. 22 is a perspective view, showing a state in which a battery-supporting structure for an electric vehicle in accordance with a fifth embodiment is employed having batteries mounted to the underside of a vehicle body thereof.

FIG. 22 illustrates a battery-supporting structure for an electric vehicle in accordance with the fifth embodiment, in which batteries 10 are fixed to the underside of a vehicle body 8.

Figure 23:
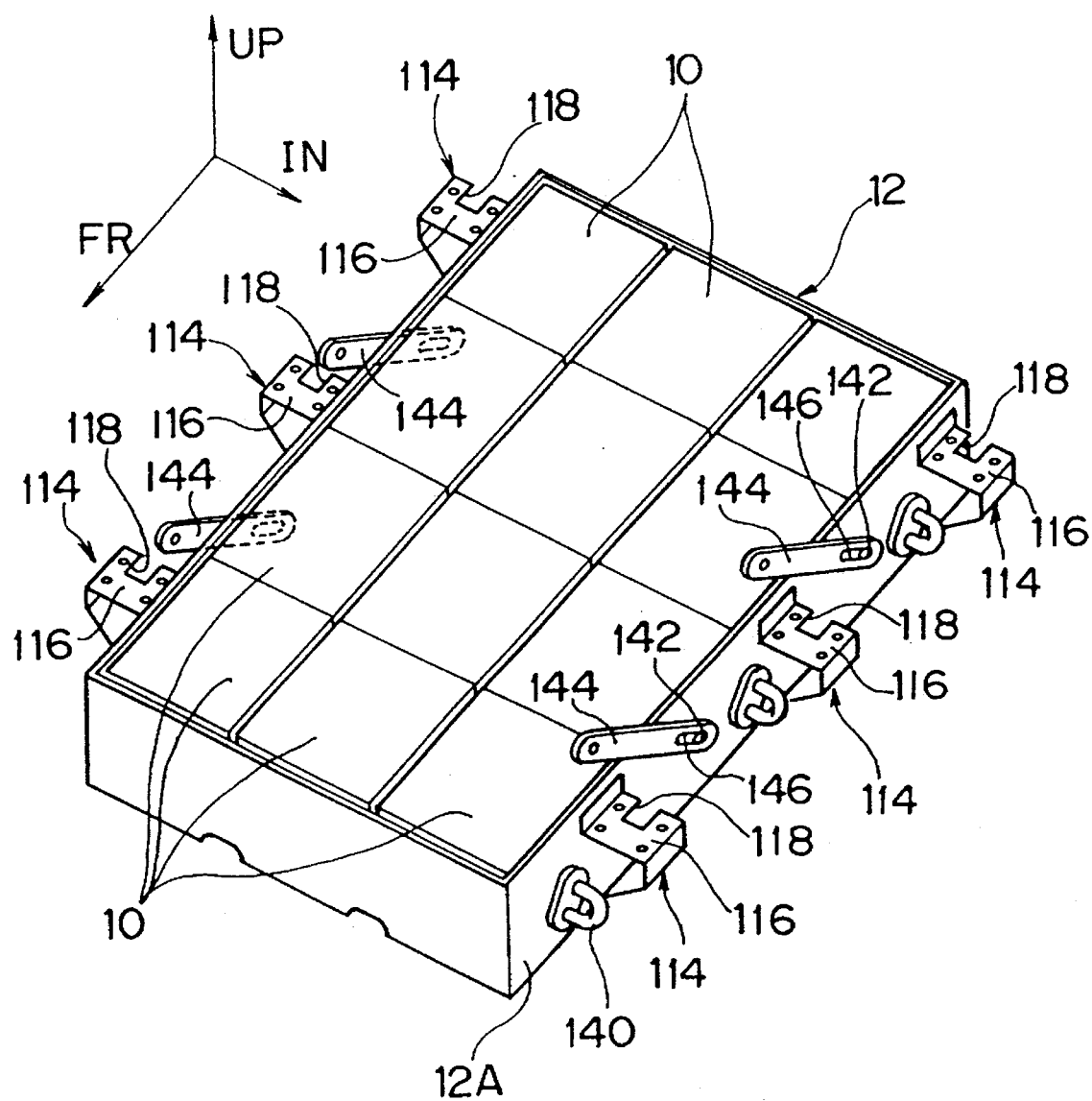
FIG. 23 is a perspective view, showing a battery carrier of the battery-supporting structure of the electric vehicle according to the fifth embodiment.
Figure 24:
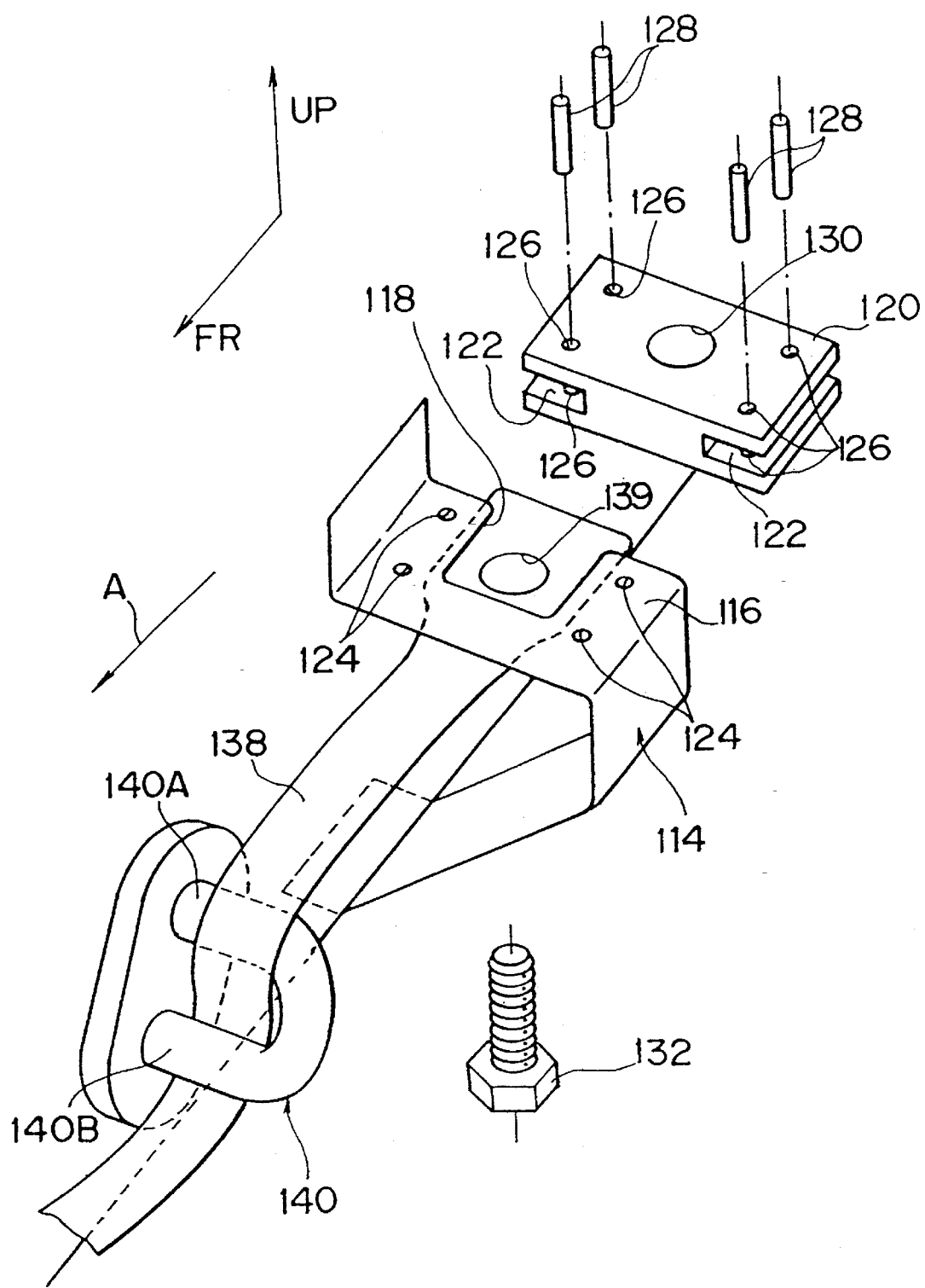
FIG. 24 is a partly perspective view, illustrating an arrangement for supporting the battery carrier of the battery-supporting structure of the electric vehicle in accordance with the fifth embodiment.

FIG. 23 shows a battery carrier 12, which is a rectangular-shaped box, with an upper side thereof open. The battery carrier 12 accommodates batteries 10 therein, which act as a power source for the electric vehicle. The battery carrier 12 has brackets 114 fixed to side surface portions 12A thereof. The brackets 114 include horizontal portions 116 which extend outwardly in the transverse direction of the vehicle. Furthermore, the horizontal portions 116 are formed with cut-out portions 118, which face in the rearward direction of the vehicle body 8. Referring to FIG. 24, the rest of the horizontal portion 116 except for the cut-out portion 118 is formed held in a pair of guide grooves 122, which are formed in both side surface portions of a rectangular-shaped support 120 in the transverse direction of the vehicle. The guide grooves 122 extend in the longitudinal direction of the vehicle, so that the bracket 114, which is held therein, can be withdrawn therefrom in the forward direction of the vehicle body 8 (in the direction of arrow A). The support 120 is formed with throughholes 126 which are punched at both end portions thereof. The horizontal portion 116 is formed with through-holes 124. Shear pins 128 are provided through the through-holes 124 and 126 in order to connect the support 120 and the bracket 114 together.

Figure 25:
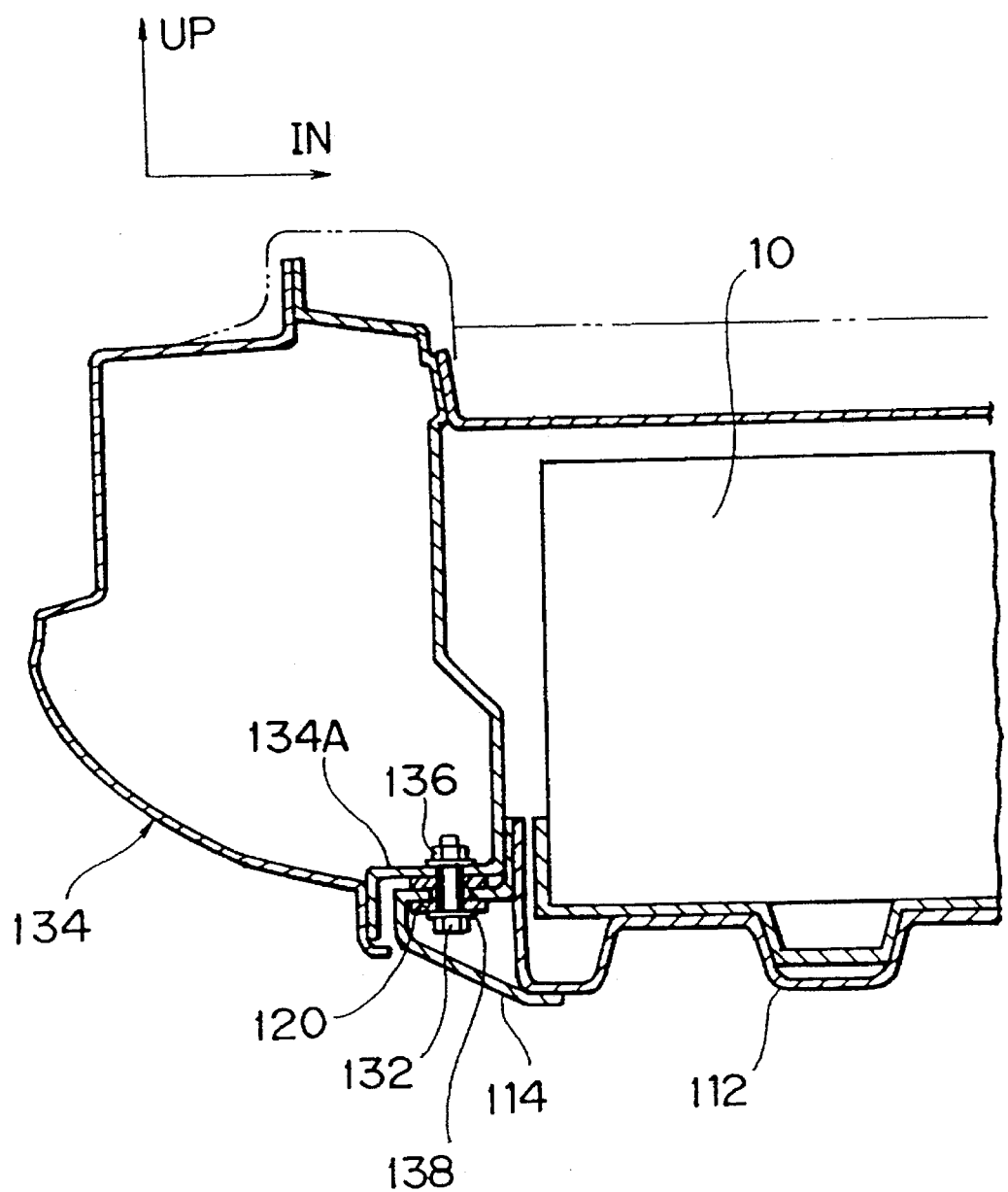
FIG. 25 is a cross-sectional view, showing a mounted state of the battery-supporting structure of the electric vehicle according to the fifth embodiment.

As shown in FIGS. 24 and 25, the support 120 has a through-hole 130 punched at a central portion thereof, through which a bolt 132 extends from the underside of the vehicle body 8. The bolt 132 is secured by a weld nut 136 which is welded to an inner plate 134A of a side sill 134. The battery carrier 12 is thereby supported by the side sill 34 via the support 120 and the bracket 114. The bolt 132 is also provided through a mounting hole 139, which is punched at an end portion of an energy-absorbing plate 138. The energy-absorbing plate 138 is a plastically deformable plate member having a small thickness. The end portion of the energy-absorbing plate 138 is thereby bolted to the side sill 134.

Referring back to FIGS. 23 and 24, energy-absorbing guide members 140 are anchored to the side surface portions 12A of the battery carrier 12 in front of fixed positions of the energy-absorbing plates 138 in the forward direction of the vehicle body 8. Each of the energy-absorbing guide members 140 is formed of a steel bar which is bent into a substantially U-shape. As illustrated in FIG. 24, the energy-absorbing guide member 140 includes an upper-supporting portion 140A and a lower-supporting portion 140B, which are formed in parallel with each other. The energy-absorbing guide member 140 is disposed in such a way that the upper-supporting portion 140A is positioned behind the lower-supporting portion 140B in the rearward direction of the vehicle body 8. An energy-absorbing plate 138 is provided through a clearance between the upper-supporting and lower-supporting portions 140A and 140B of the energy-absorbing guide member 140, so as to be forced into contact with the outer-circumferential surface portions of the upper-supporting and lower-supporting portions 18A and 18B.

Figure 28:
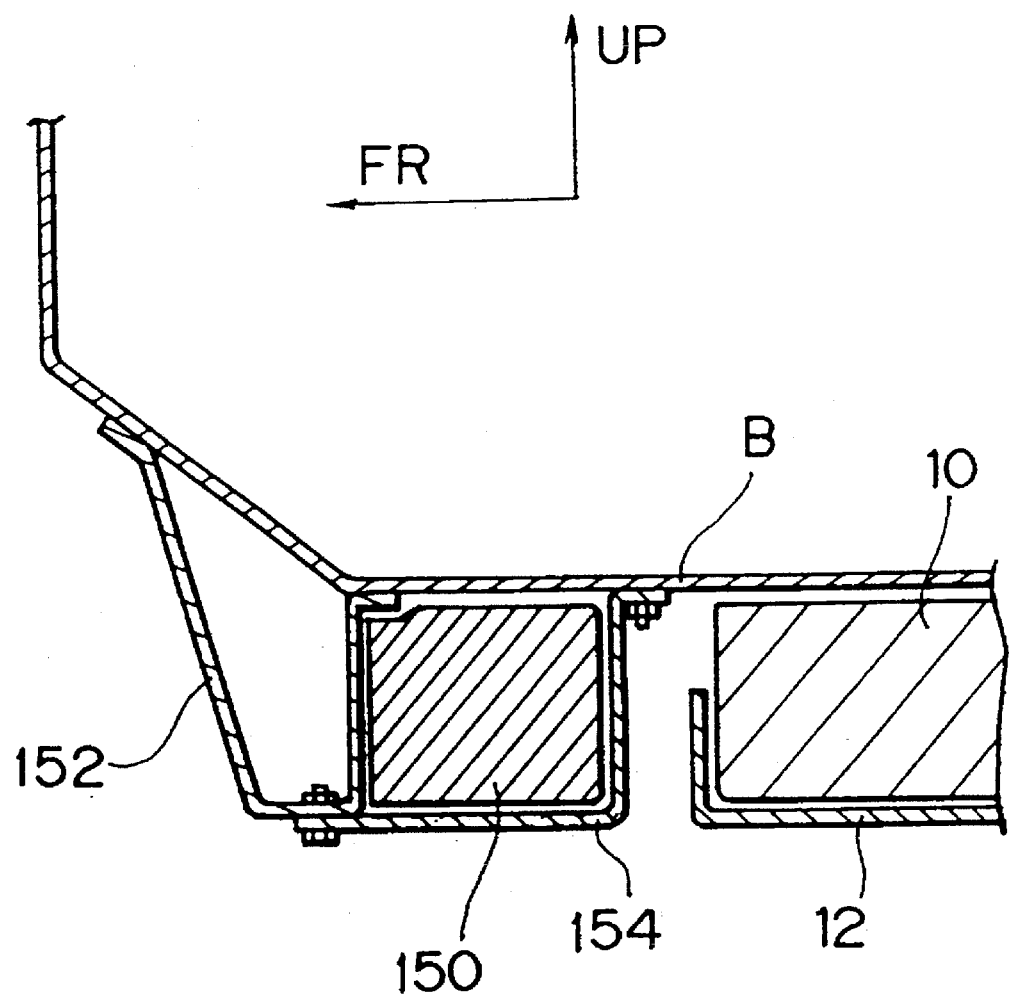
FIG. 28 is a cross-sectional view, illustrating a mounted state of a battery-supporting structure of an electric vehicle according to a sixth embodiment.

As illustrated in FIG. 23, the battery carrier 12 is further provided with pins 142, which project outwardly from the side surface portions 12A thereof. The pins 142 are provided through elongate holes 146 which are punched at one end portions of linking members 144. The other end portions of the linking members 144 are pivotably supported by the side sill 134. The battery carrier 12 is thereby suspended and swingable relative to the vehicle body 8, as shown in FIG. 28.

The operation of the battery-supporting structure for the electric vehicle according to the fifth embodiment will now be described. When a front body of the electric vehicle is in collision, the battery carrier 12 is urged to move in the forward direction of the vehicle body 8 by inertial force, so as to consume kinetic energy thereof which has been retained immediately before the collision.

When this kinetic energy exceeds the shearing stress of the shear pins 128, the shear pins 128 will break away, thereby releasing a state in which the support 120 and the bracket 114 remain connected together. As the bracket 114 slides along the pair of guide grooves 122 that are formed in the support 120, the battery carrier 12 is urged to move in the forward direction of the vehicle body 8.

Figure 26:
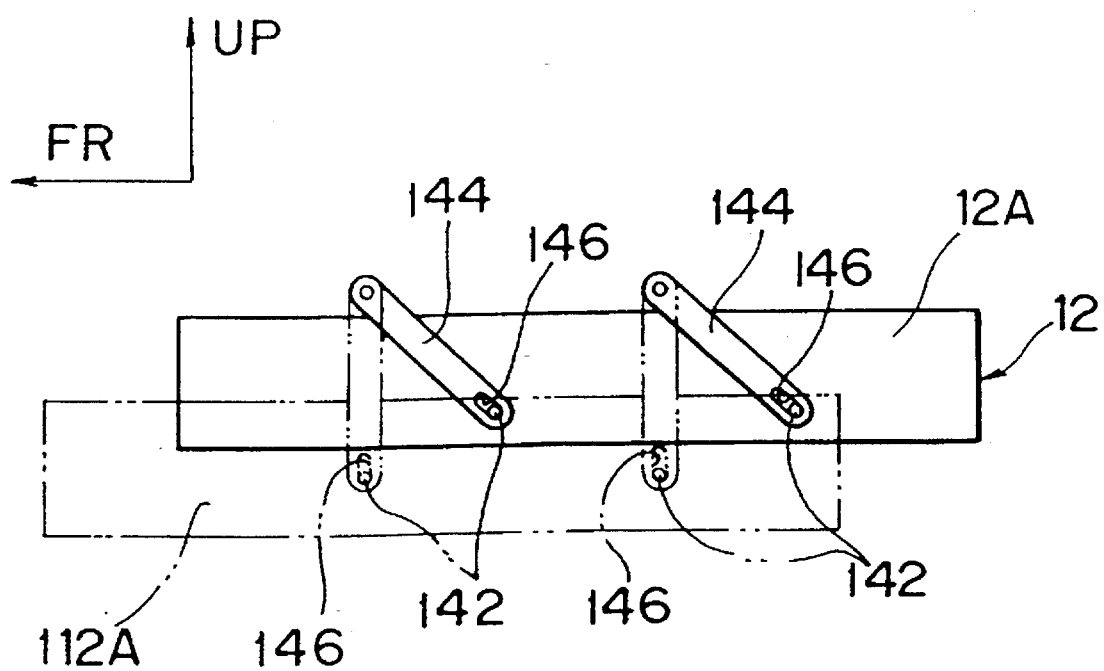
FIG. 26 is a side view, showing a swinging state of the battery carrier of the battery-supporting structure of the electric vehicle according to the fifth embodiment.
Figure 27:
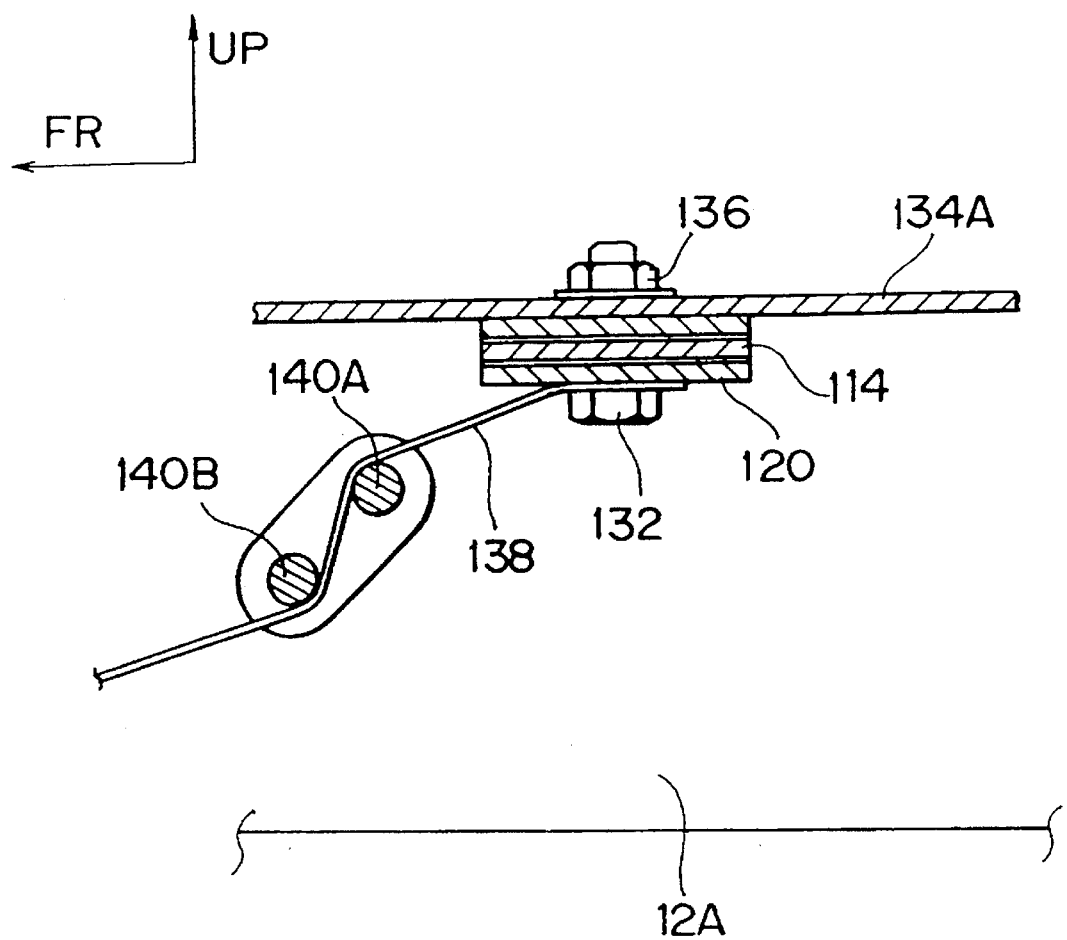
FIG. 27 is a cross-sectional view, showing the operation of an energy-absorbing plate of the battery-supporting structure of the electric vehicle according to the fifth embodiment.

At this time, as shown in FIG. 27, the upper-supporting and lower-supporting portions 140A and 140B of the energy-absorbing guide member 140, which is fixed to the side surface portion 12A of the battery carrier 12, continuously flexes the energy-absorbing plate 138 by scraping against both side surface portions of the energy-absorbing plate 138, which is fixed at one end to the side sill 134. In this way, the upper-supporting and lower-supporting portions 140A and 140B are urged to move in the forward direction of the vehicle body 8. The kinetic energy of the battery carrier 12 is thereby absorbed and consumed for conversion into energy of deforming the energy-absorbing plate 138. In addition, as shown in FIG. 26, since the battery carrier 12 is suspended on these swingable linking members 144, the battery carrier 12 remains held to the underside of the vehicle body 8 without dropping to the ground, even after breaking loose from the support 120. Furthermore, the pins ]42, which are provided on the battery carrier 12 and project outwardly therefrom, are rotatably supported by the elongate holes 146, thereby placing no restrictions on forward movement of the battery carrier 12 at an initial stage after a collision.

As can be seen from the above, in the battery-supporting structure for the electric vehicle according to the fifth embodiment, the vehicle body 8 is prevented from experiencing impact kinetic energy, which increases with the batteries 10 loaded in the vehicle. Thus, there is no need for increasing the strength of the front-side members and the like, and a lighter-weight electric vehicle is achievable.

As described previously, the battery-supporting structure for the vehicle according to the present embodiment is provided by the linking member 144 and the energy-absorbing plate 138. Alternatively, it is possible to omit the linking member 144 therefrom and form a battery-supporting structure such that the battery carrier 12 is permitted to fall to the ground after the kinetic energy of the batteries 10 is absorbed by the energy-absorbing plate 138. As a further alternative, it is possible to omit the energy-absorbing plate 138 therefrom and construct a structure such that the battery carrier 12 is released from the vehicle body 8 through a collision so as to prevent the kinetic energy of the batteries 10 from influencing the vehicle body 8.

A battery-supporting structure for an electric vehicle in accordance with a sixth embodiment will now be described.

Figure 29:
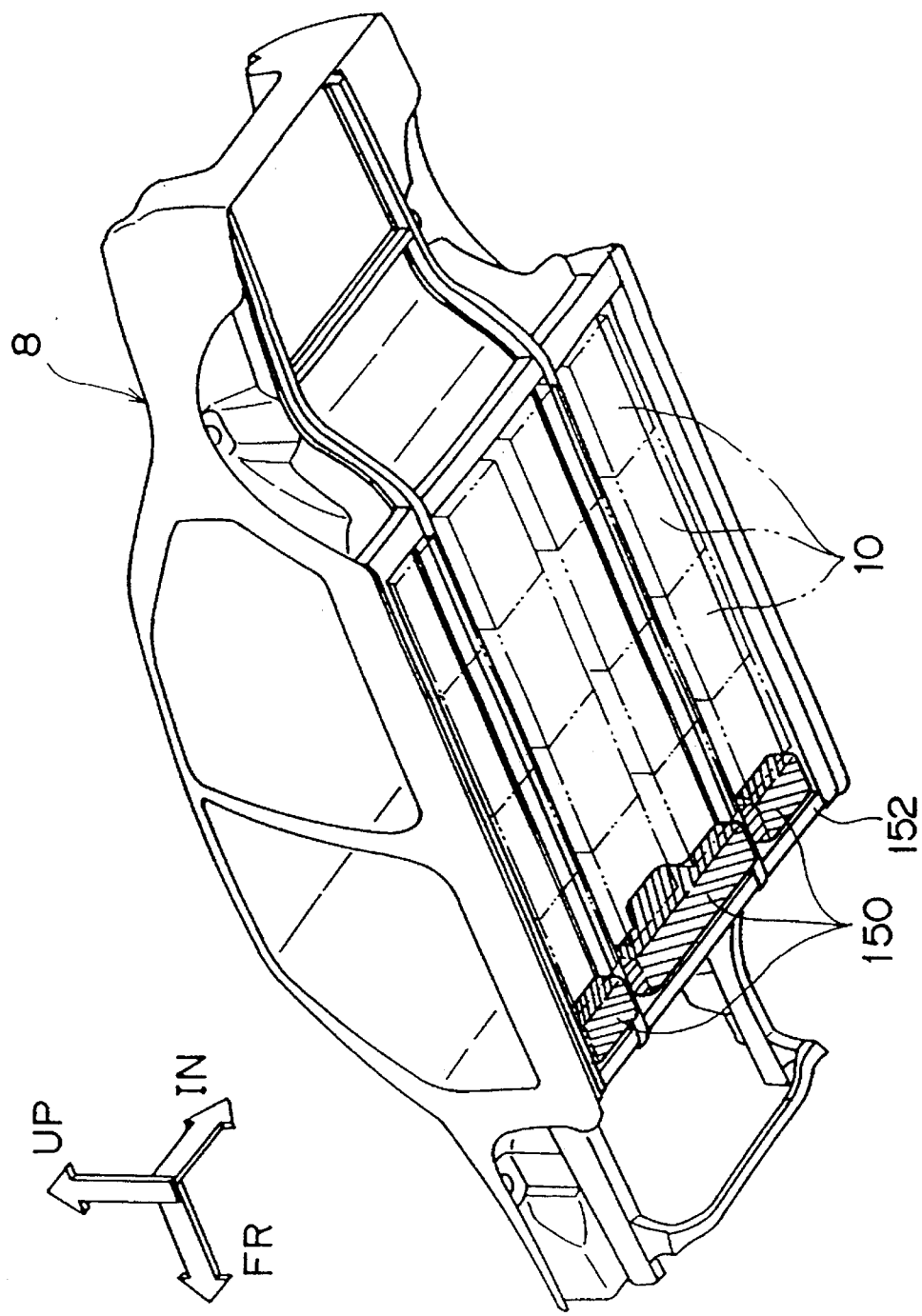
FIG. 29 is a perspective view, illustrating a state in which the battery-supporting structure of the electric vehicle according to the sixth embodiment is employed having batteries mounted to the underside of a vehicle body thereof.

FIGS. 28 and 29 illustrate the present embodiment, in which the energy-absorbing plates 138 are replaced by energy-absorbing members 150, which are provided in front of a battery carrier 12 and spaced apart therefrom by a predetermined distance. The energy-absorbing member 150 is formed of a shock-absorbing member such as P.P. beads or urethane foam, which is molded into an substantial box-shape. The energy-absorbing member 150 is held by a L-shaped stop member 154 which is anchored to a body member 152 and the underside of the vehicle body 8. Similarly to the fifth embodiment, a supporting structure for the battery carrier 12 includes a support 120, a bracket 114, and a shear pin 128.

According to the present embodiment, when the battery carrier 12 breaks loose from the support 120 and moves in the forward direction of the vehicle body 8, the energy-absorbing member 150 is crushed to absorb the kinetic energy of the batteries 10.

Next, a battery-supporting structure for an electric vehicle in accordance with a seventh embodiment will be described.

Figure 30:
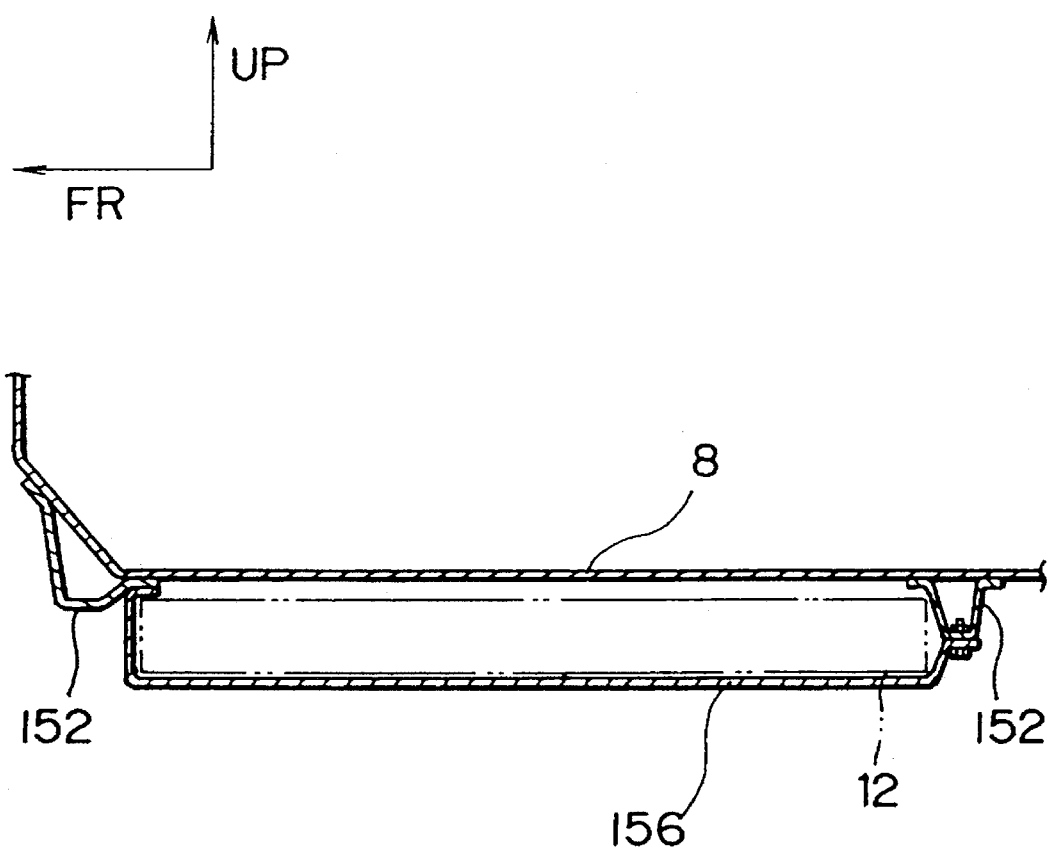
FIG. 30 is a cross-sectional view, showing a mounted state of a battery-supporting structure of an electric vehicle according to a seventh embodiment; and, FIG. 31 is a perspective view, showing a state in which the battery-supporting structure of the electric vehicle according to the seventh embodiment is employed having batteries mounted to the underside of a vehicle body thereof.
Figure 31:
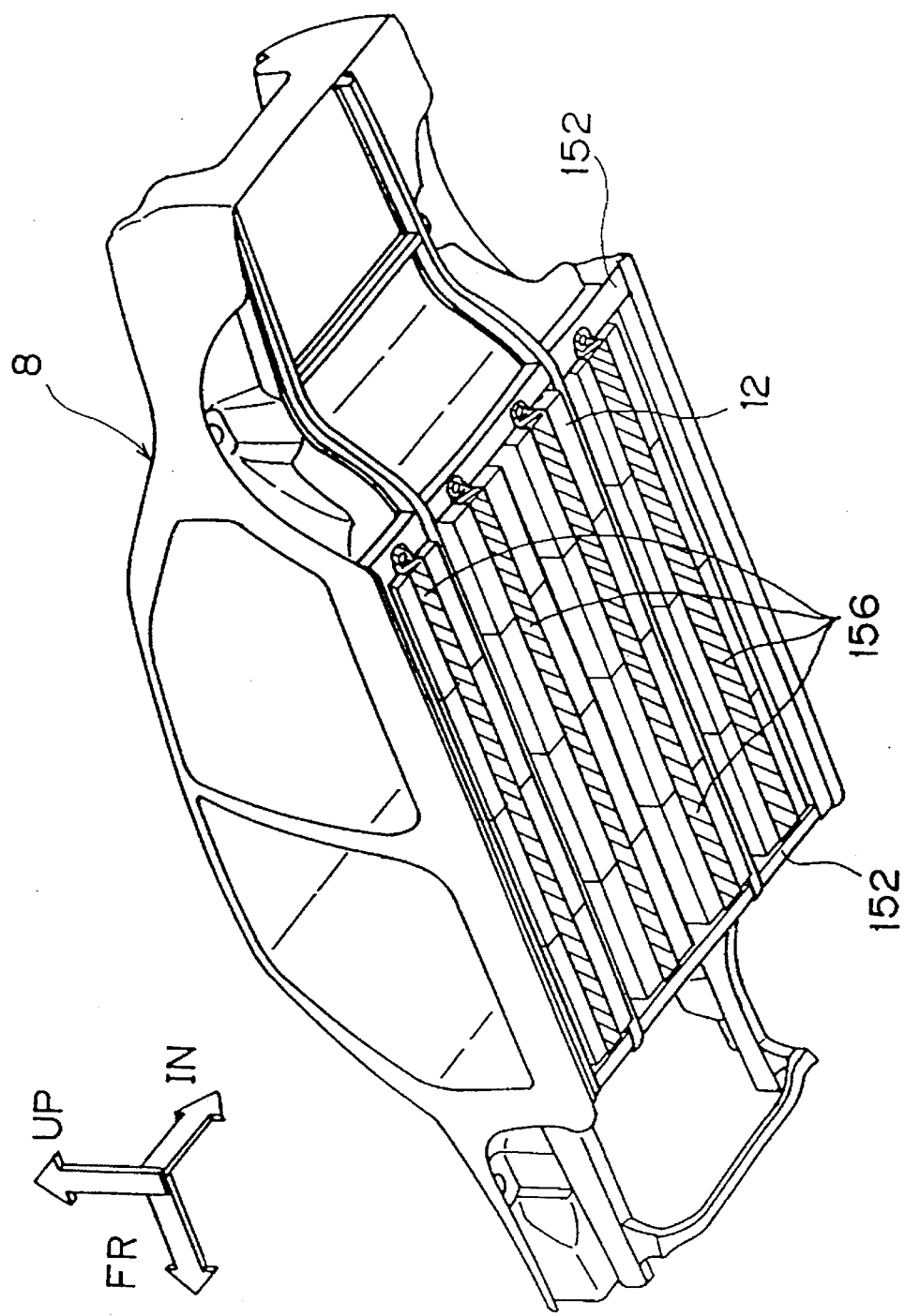

FIGS. 30 and 31 illustrate the present embodiment, in which a battery carrier 12 is bound with belts 156 which extend in the longitudinal direction of the vehicle. The belt 156, which is made of an elastic member, is fixed at both ends to body members 152. Similarly to the fifth embodiment, a supporting structure for the battery carrier 12 includes a support 120, a bracket 114, and a shear pin 128.

According to the present embodiment, when the battery carrier 12 breaks loose from the support 120 and moves in the forward direction of the vehicle body 8, the belt 156 is stretched out to absorb the kinetic energy of batteries 10. The battery carrier 12 does not fall to the ground after absorption of the kinetic energy because it is bound by the belts 156.

What is claimed is:

1. An electric vehicle comprising:

a main frame;

a sub-frame attached to said main frame;

a motor section attached to said main frame, said motor section being positioned forwardly of said sub-frame and spaced a predetermined distance therefrom;

a battery carrier having flange portions engageable with said main frame, each flange portion having a plurality of elongated holes of predetermined length with parallel sidewalls;

a plurality of fastener bolts fixedly secured to said main frame, each of said plurality of fastener bolts extending through a respective hole for securing said battery carrier to said main frame rearwardly of said sub-frame, and each of said plurality of fastener bolts having a diameter less than a spacing between said parallel sidewalls of respective ones of said plurality of elongated holes, said plurality of elongated holes permitting longitudinal movement of said battery carrier relative to said fastener bolts and said main frame;

said battery carrier being securely maintained by said plurality of fastener bolts to said main frame a predetermined distance from said sub-frame during normal vehicle operation;

said motor section impacting with said sub-frame, and said plurality of fastener bolts and said plurality of elongated holes permitting said battery carrier to move in a forwardly direction relative to said main frame for impact with said sub-frame, in the event of a frontal collision.

2. An electric vehicle according to claim 1, further comprising:

a holding mechanism on said motor section for supporting said sub-frame which may be deformed in said frontal collision of said vehicle.

3. An electric vehicle according to claim 1, wherein:

said sub-frame has a substantially planar surface portion which is held in contact with said battery carrier.

* * * * *